(12) United States Patent
Inoue et al.

(10) Patent No.: US 7,237,248 B2
(45) Date of Patent: Jun. 26, 2007

(54) DISK CARTRIDGE

(75) Inventors: Naoki Inoue, Kanagawa (JP); Susumu Shibagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 469 days.

(21) Appl. No.: 10/814,281

(22) Filed: Apr. 1, 2004

(65) Prior Publication Data

US 2004/0255319 A1  Dec. 16, 2004

(30) Foreign Application Priority Data

Apr. 3, 2003 (JP) ............................ P2003-100159

(51) Int. Cl.
*G11B 23/03* (2006.01)
(52) U.S. Cl. .................................... 720/741
(58) Field of Classification Search ................ 720/741, 720/742, 738; 360/133
See application file for complete search history.

(56) References Cited

U.S. PATENT DOCUMENTS

| | | | | |
|---|---|---|---|---|
| 5,530,691 | A * | 6/1996 | Fujisawa | 720/731 |
| 5,815,487 | A * | 9/1998 | Fujisawa | 720/731 |
| 6,356,527 | B1 * | 3/2002 | Shiomi et al. | 720/738 |
| 6,590,858 | B2 * | 7/2003 | Inoue | 720/742 |
| 6,700,741 | B2 * | 3/2004 | Inoue et al. | 360/133 |
| 6,728,199 | B2 * | 4/2004 | Obata et al. | 720/738 |
| 6,810,005 | B2 * | 10/2004 | Shiomi et al. | 720/738 |
| 6,900,965 | B2 * | 5/2005 | Inoue et al. | 360/133 |
| 6,901,602 | B2 * | 5/2005 | Inoue | 720/742 |
| 6,912,725 | B2 * | 6/2005 | Oishi | 720/741 |
| 7,000,240 | B2 * | 2/2006 | Inoue | 720/741 |
| 7,017,170 | B2 * | 3/2006 | Iwaki et al. | 720/741 |
| 7,103,898 | B2 * | 9/2006 | Iwaki et al. | 720/728 |
| 7,103,900 | B2 * | 9/2006 | Iwaki et al. | 720/736 |
| 2004/0022172 | A1 * | 2/2004 | Obate et al. | 369/291 |
| 2004/0062175 | A1 * | 4/2004 | Inoue | 369/77.2 |
| 2004/0163100 | A1 * | 8/2004 | Kawaguchi et al. | 720/741 |
| 2004/0205809 | A1 * | 10/2004 | Saji et al. | 720/741 |
| 2004/0210921 | A1 * | 10/2004 | Shibagaki et al. | 720/741 |
| 2005/0060736 | A1 * | 3/2005 | Song | 720/738 |
| 2005/0076356 | A1 * | 4/2005 | Yamada et al. | 720/726 |
| 2005/0081234 | A1 * | 4/2005 | Shiga | 720/741 |
| 2005/0091677 | A1 * | 4/2005 | Imai | 720/741 |
| 2005/0091678 | A1 * | 4/2005 | Park et al. | 720/742 |
| 2005/0120365 | A1 * | 6/2005 | Takizawa et al. | 720/741 |
| 2005/0149963 | A1 * | 7/2005 | Iwaki et al. | 720/741 |
| 2005/0160447 | A1 * | 7/2005 | Iwaki et al. | 720/741 |

(Continued)

FOREIGN PATENT DOCUMENTS

JP       7-29350       1/1995

(Continued)

*Primary Examiner*—Allen Cao
(74) *Attorney, Agent, or Firm*—Oblon, Spivak, McClelland, Maier & Neustadt, P.C.

(57) ABSTRACT

A slidable rotation of the inner shell to the outer shell causes slidable rotation of the shutter members to open or close the opening portion of the outer shell, and the disk cartridge is inserted into an insertion opening of the disk drive apparatus so that the disk-shaped recording medium is mounted on the disk table to be used. An discrimination groove opened at least to an insertion direction side to the insertion opening of the disk drive apparatus for performing discrimination from another type of the disk cartridge is formed on the outer shell.

5 Claims, 26 Drawing Sheets

U.S. PATENT DOCUMENTS

| | | | |
|---|---|---|---|
| 2005/0204377 A1* | 9/2005 | Oishi | 720/741 |
| 2005/0210497 A1* | 9/2005 | Oishi et al. | 720/741 |
| 2005/0251818 A1* | 11/2005 | Hashizume et al. | 720/738 |
| 2005/0273801 A1* | 12/2005 | Funawatari et al. | 720/741 |
| 2006/0259919 A1* | 11/2006 | Funawatari et al. | 720/741 |

FOREIGN PATENT DOCUMENTS

| | | |
|---|---|---|
| JP | 2000-156061 | 6/2000 |
| JP | 2001-250363 | 9/2001 |
| JP | 2001-291357 | 10/2001 |
| JP | 2001-297553 | 10/2001 |
| JP | 2001-332058 | 11/2001 |
| JP | 2003-51168 | 2/2003 |

* cited by examiner

DISK CARTRIDGE

CROSS REFERENCE TO RELATED APPLICATION

This application claims priority from Japanese Priority Document No. 2003-100159, filed on Apr. 3, 2003 with the Japanese Patent Office, which document is hereby incorporated by reference.

BACKGROUND OF THE INVENTION

1. Field of the Invention

The present invention generally relates to a disk cartridge, and more particularly to a technical field for making it possible to discriminate a disk cartridge easily at a stage before the insertion of the whole of the disk cartridge into a disk drive apparatus by forming a discrimination groove on the outer shell of the disk cartridge for performing discrimination of the disk cartridge from other type ones.

2. Description of the Related Art

There is a type of a disk cartridge including an inner shell supported to slidably rotate in the inside of an outer shell, shutter members supported to slidably rotate on the inner shell, and a disk-shaped recording medium rotatably housed in a housing space formed between the inner shell and the outer shell. As the inner shell slidably rotates against the outer shell, the shutter members are slidably rotated to open or close an opening portion of the outer shell (see, for example, Japanese Laid-open Patent Application No. 2001-332058A).

Some of the above-mentioned disk cartridges are designed to have substantially the same outside dimensions, even if the disk cartridges are different types from one another, for realizing low prices by commonly using parts.

As these disk cartridges designed to have substantially the same outside dimensions, there are, for example, rewritable disk cartridges and write once-type disk cartridges corresponding to the rewritable disk cartridges, the rewritable disk cartridges and read only memory type disk cartridges corresponding to the rewritable disk cartridges, disk cartridges meeting with the standards for consumer use and disk cartridges meeting with the standards for professional use corresponding to the disk cartridges meeting with the standards for consumer use, and the like.

However, in such different types of disk cartridges designed to have the same outside dimensions, when a user tries to insert one type of disk cartridge among the disk cartridges into the insertion opening of a disk drive apparatus, there is the possibility that the user erroneously inserts the other type of the disk cartridge into the insertion opening of the disk drive apparatus because the outside dimensions are substantially the same.

Accordingly, some types of the disk drive apparatus are configured so as to read the identification (ID) recorded previously on a disk-shaped recording medium of the disk cartridge to eject the other type of the disk cartridge when the above-mentioned erroneous insertion is done.

However, when such a disk drive apparatus ejects the erroneously inserted disk cartridge upon reading out the ID as described above, the recognition of the erroneous insertion is not performed until the reading operation of the disk-shaped recording medium of the inserted disk cartridge is performed. Consequently, it is needed to take a time until the disk-shaped recording medium of the disk cartridge is mounted on the disk table of the disk drive apparatus, a time for performing the reading of the recorded ID, and a time for performing the ejection of the disk cartridge from the disk drive apparatus, and then a user must wait for so much time until the user can use one type of the disk cartridges. Hence, the disk drive apparatus has a problem that the usability of the apparatus is not so good.

Moreover, the identification information (ID) indicating whether the type of a disk cartridge is one type or the other type is recorded on the disk-shaped recording medium. Consequently, when an alteration or the like of the recorded identification information is performed, for example, at the time of reconstruction or the like of recorded information, the disk drive apparatus cannot judge at all which type of the disk cartridge the inserted disk cartridge is. Such a situation has the possibility of causing various disadvantages such as illegal processing of information recorded on the disk-shaped recording medium, damage of the recorded surface of the disk-shaped recording medium by being irradiated by a laser beam having power not corresponding to the recording medium, and a breakdown of an inside mechanism of the disk drive apparatus.

On the other hand, in some types of disk cartridges designed to be substantially the same, for achieving the improvement of a transfer rate and the improvement of the workability of editing work and the like, the opening portion of the outer shell of one type of the disk cartridges is configured to be larger than that of the other type of the disk cartridges, and the disk drive apparatus corresponding to the other type of the disk cartridges is provided with two optical heads (optical pickups) to be configured in order that the two optical heads may be arranged to be opposed to a disk-shaped recording medium with an opening portion put between the two optical heads at the same time when the disk-shaped recording medium is mounted on a disk table.

Then, when one type of the disk cartridges is inserted by mistake, one of the optical heads escapes for avoiding the contact of a part of the disk cartridge where the opening portion is not formed with the optical head. However, the disk drive apparatus needs a space for the escape of the optical head, and becomes larger in size by the space.

SUMMARY OF THE INVENTION

Accordingly, a disk cartridge according to the present invention aims to overcome the above mentioned problems to enable a user to discriminate the disk cartridge easily at a stage before the insertion of the whole of the disk cartridge into a disk drive apparatus.

A disk cartridge according to a first aspect of the present invention, for solving the problems, includes an outer shell at least having an opening portion through which a disk table of a disk drive apparatus is inserted, an inner shell supported to slidably rotate in an inside of the outer shell, shutter members supported to slidably rotate at the inner shell, and a disk-shaped recording medium rotatably housed in a housing space formed between the inner shell and a first shell, whereby slidable rotation of the inner shell to the outer shell causes slidable rotation of the shutter members to open or close the opening portion of the outer shell, and the disk cartridge is inserted into an insertion opening of the disk drive apparatus so that the disk-shaped recording medium is mounted on the disk table to be used, wherein an discrimination groove opened at least to an insertion direction side to the insertion opening of the disk drive apparatus for performing discrimination from another type of the disk cartridge is formed on the outer shell.

Consequently, in the disk cartridge of the present invention, the discrimination of the type of the disk cartridge is performed on the basis of the existence of the discrimination groove on the outer shell.

Consequently, the type of the disk cartridge is discriminated at the time of the insertion of the disk cartridge into the insertion opening. When the insertion of the disk cartridge is an erroneous insertion, the disk cartridge can be taken out immediately after the insertion of the disk cartridge into the insertion opening. Thereby, the improvement of usability can be achieved.

Moreover, there is no need for providing any complicated discrimination mechanisms for performing the discrimination of the disk cartridge from the other types of disk cartridges in the inside of the disk drive apparatus, and consequently the simplification of the mechanism of the disk drive apparatus and the reduction of a manufacturing cost can be achieved.

According to a second aspect of the present invention, an interior surface in an opposite direction to the insertion direction of the discrimination groove on the outer shell is formed as a positional reference surface for performing positioning in the insertion direction. Consequently, the positioning of the disk cartridge to the disk drive apparatus can be performed certainly and smoothly when the disk-shaped recording medium is mounted on the disk table.

According to a third aspect of the present invention, each of the first shell and a second shell includes a principal surface portion positioned to be opposed to the disk-shaped recording medium, and a peripheral surface portion formed on a peripheral edge of the principal surface portion, and the discrimination groove is formed without penetrating between the principal surface portion of the first shell and the principal surface portion of the second shell. Consequently, for example, each portion such as ejection levers to be provided in the inside of the disk drive apparatus is not inserted into the discrimination groove, and defects such as ejection errors owing to the ejection levers can be prevented.

According to a fourth aspect of the present invention, a reference area to be a reference of the positioning of the disk cartridge to the disk drive apparatus when the disk cartridge is inserted into the inside of the disk drive apparatus is formed on the outer shell, and the discrimination groove is formed in the neighborhood of the reference area. Consequently, when the disk cartridge is inserted into another type of disk drive apparatus by mistake, it is possible to avoid interference with each portion such as the ejection levers.

According to a fifth aspect of the present invention, only one discrimination groove is formed as the discrimination groove. Consequently, the possibility of not-intended insertion of each portion provided in the inside of the disk drive apparatus into the discrimination groove can be decreased in comparison with the case of forming a plurality of discrimination grooves.

DETAILED DESCRIPTION OF THE PREFERRED EMBODIMENTS

Hereinafter, the attached drawings will be referred to while the preferred embodiment of a disk cartridge according to the present invention is described. Incidentally, in the following embodiment, a disk cartridge 1 in accordance with one of the standards for professional use which is also compatible with a Blu-ray (Trademark) disk, one of the standards for consumer use, will be described as an example. However, the present invention can be applied to the disk cartridges other than ones compatible with the Blu-ray disk.

First, a disk drive apparatus in which the disk cartridge 1 is inserted to be used will be described (see FIGS. 1 to 7). A disk drive apparatus 50 is composed of an outer casing 51 in which predetermined each portion is arranged (see FIG. 1). On a front surface of the outer casing 51, an insertion opening 51a extended in a lateral direction is formed. The insertion opening 51a functions not only as an insertion portion through which the disk cartridge 1 is inserted in the outer casing 51, but also as an ejection portion through which the disk cartridge 1 is ejected from the outer casing 51.

Figure 2:
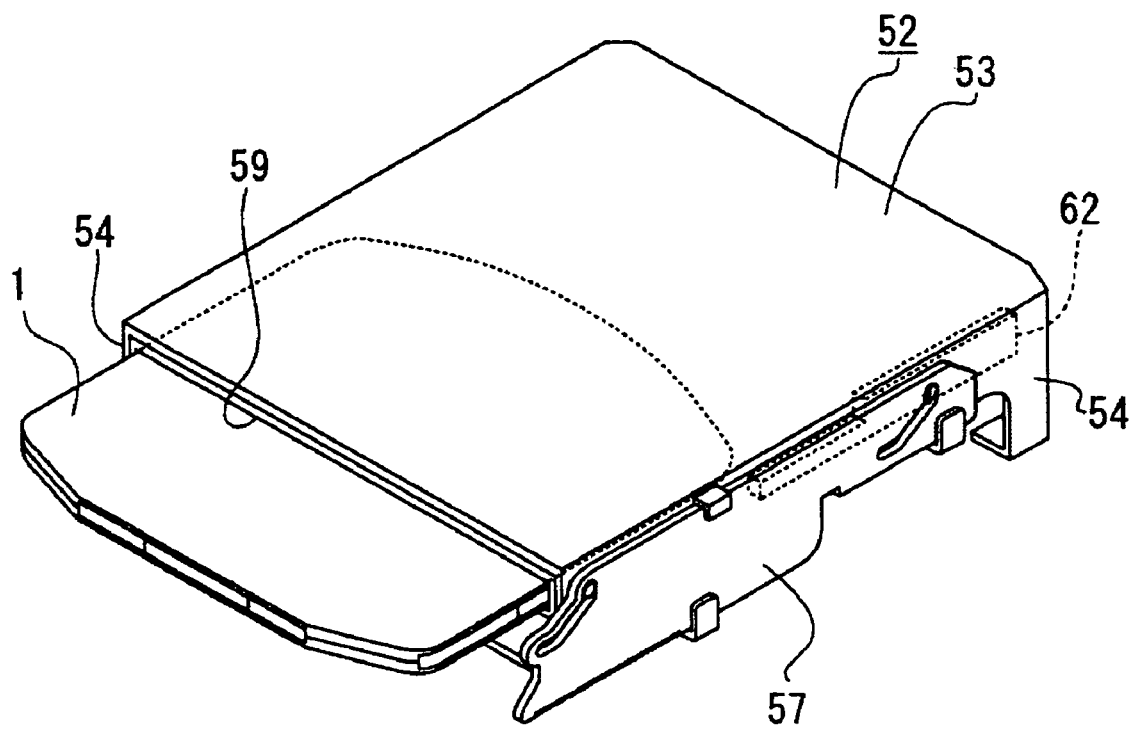
FIG. 2 is a schematic perspective view showing the disk cartridge and a disk holder.

In the outer casing 51, a fixed frame 52 is arranged. As shown in FIG. 2, the fixed frame 52 includes a top plate portion 53 and side plate portions 54 provided perpendicularly downward from side edges on both sides of the top plate portion 53. In each of the side plate portions 54, two guide holes 55 separated at front and rear positions are formed (see FIG. 3). The guide holes 55 are severally composed of a horizontal portion 55a elongated in front and rear directions and a vertical portion 55b elongated downward from one end of the horizontal portion 55a. At the lower end of each of the side plate portions 54, drive gears 56 are supported. The drive gears 56 are synchronously rotated by the driving force of a not shown drive motor.

Figure 3:
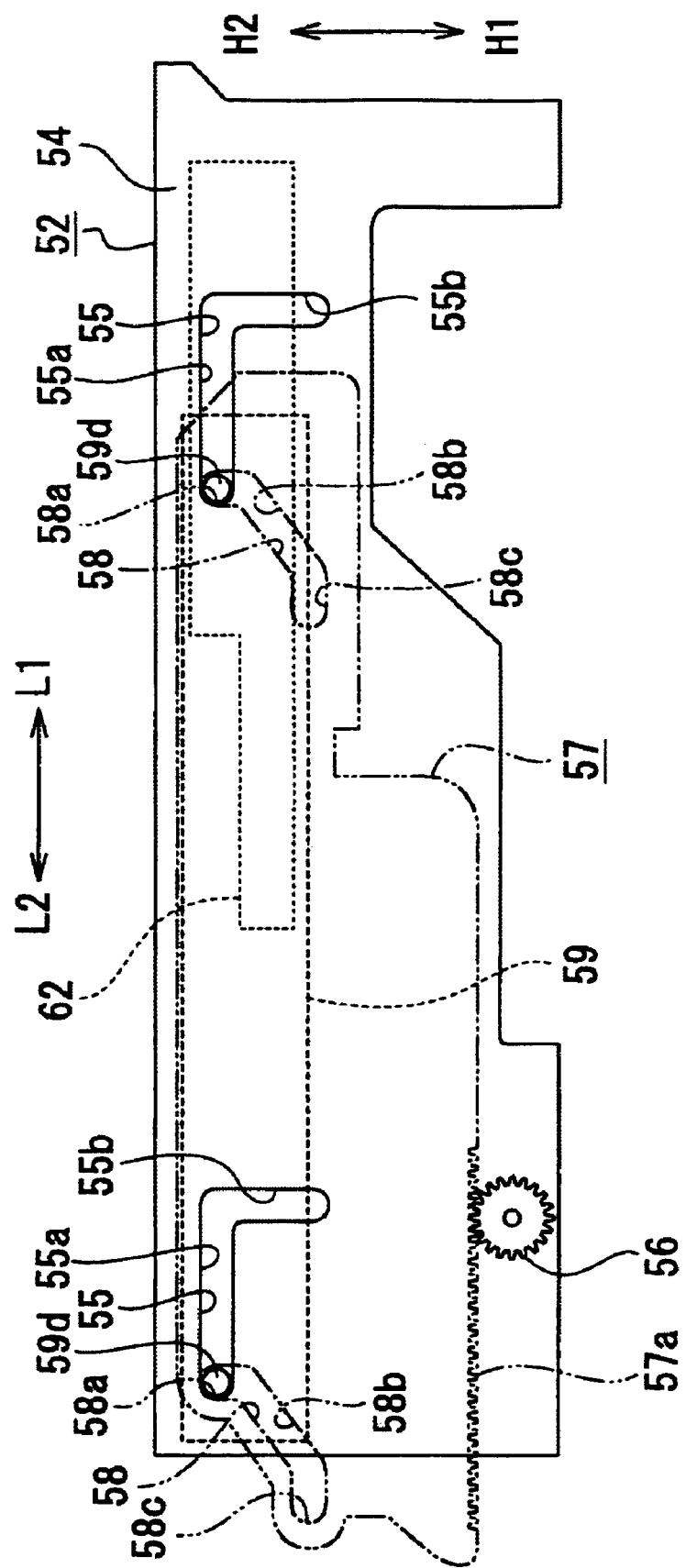
FIG. 3 is a schematic side view showing a fixed frame, a cam slider and a rack member.

In each of the side plate portions 54, cam sliders 57 are supported slidably in a front and rear direction (a L1–L2 direction shown in FIG. 3). At a lower end of each of the cam sliders 57, rack portions 57a are formed. The drive gears 56 are engaged with the rack portions 57a respectively. Consequently, when the drive gears 56 are rotated by the driving force of the drive motor, the cam sliders 57 are synchronously slid between the L1 and L2 directions shown in FIG. 3 according to the rotation directions of the drive gears 56.

In each of the cam sliders 57, cam holes 58 are formed separately at front and rear positions. Each of the cam holes 58 is composed of an upper side holding portion 58a, a cam inclining portion 58b continued from the upper side holding portion 58a, and a lower side holding portion 58c continued from the cam inclining portion 58b. The more a position of the cam inclining portion 58b advances toward the L2 direction, the more the position is displaced downward. The lower side holding portion 58c is formed to be elongated in a front and rear direction.

In the inside of the fixed frame 52, a disk holder 59 is arranged (see FIGS. 2 and 3). The disk holder 59, as shown in FIG. 4, includes a top surface portion 59a, side surface portions 59b provided perpendicularly downward from side edges on both sides of the top surface portion 59a, and receiving surface portions 59c protruding from the inferior edges of the side surface portions 59b toward a closing direction to each other.

On each of the side surface portions 59b, two guided pins 59d are provided separately at a front position and at a rear position. The guided pins 59d severally protrude toward the outside (side directions) from the side surface portions 59b.

The guided pins 59d are, as shown in FIG. 3, inserted into the guide holes 55 of the fixed frame 52 and the cam holes 58 of the cam sliders 57 to be slidably engaged with the guide holes 55 and the cam holes 58, respectively.

Figure 4:
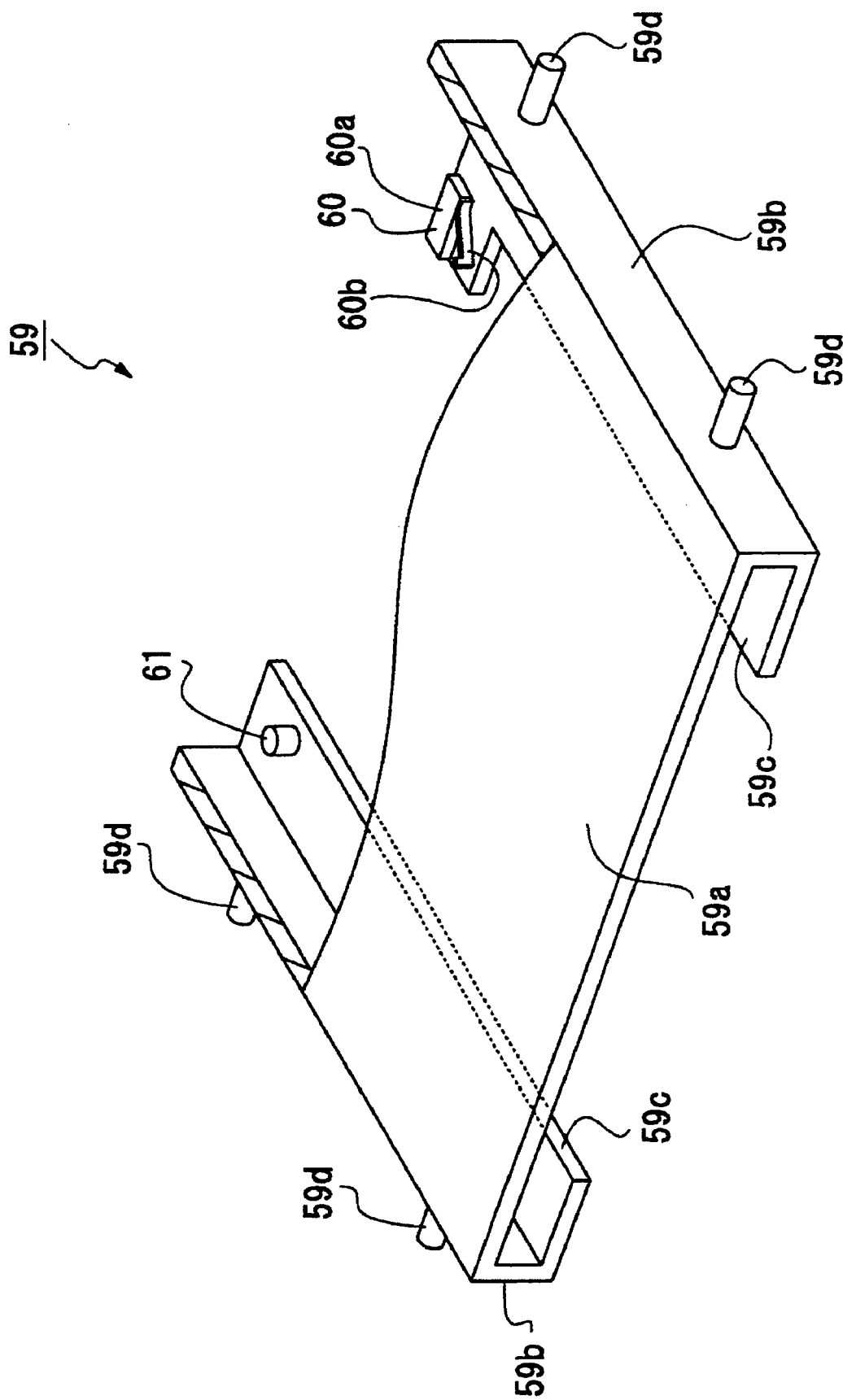
FIG. 4 is a perspective view showing the disk holder broken in part.

At the rear end of the receiving surface portion 59c on the right side, a detection sensor 60 is arranged (see FIG. 4). The detection sensor 60 includes a substrate 60a, and a detection arm 60b so as to rotate against the substrate 60a. When the detection arm 60b is rotated by being pressed toward the direction of the substrate 60a, completion of the insertion of the disk cartridge 1 into the disk holder 59 is detected. Incidentally, the means for detecting the insertion completion state of the disk cartridge 1 to the disk holder 59 is not limited to the detection sensor 60, but other detection sensors such as an optical sensor and a magnetic sensor can be used in place of the detection sensor 60.

In the inside of the disk holder 59, a not shown presser bar spring for energizing the disk cartridge 1 downward is arranged. At the rear end of the left side receiving surface portion 59c, a discrimination pin 61 protruding in the upper direction is formed (see FIG. 4).

Figure 1:
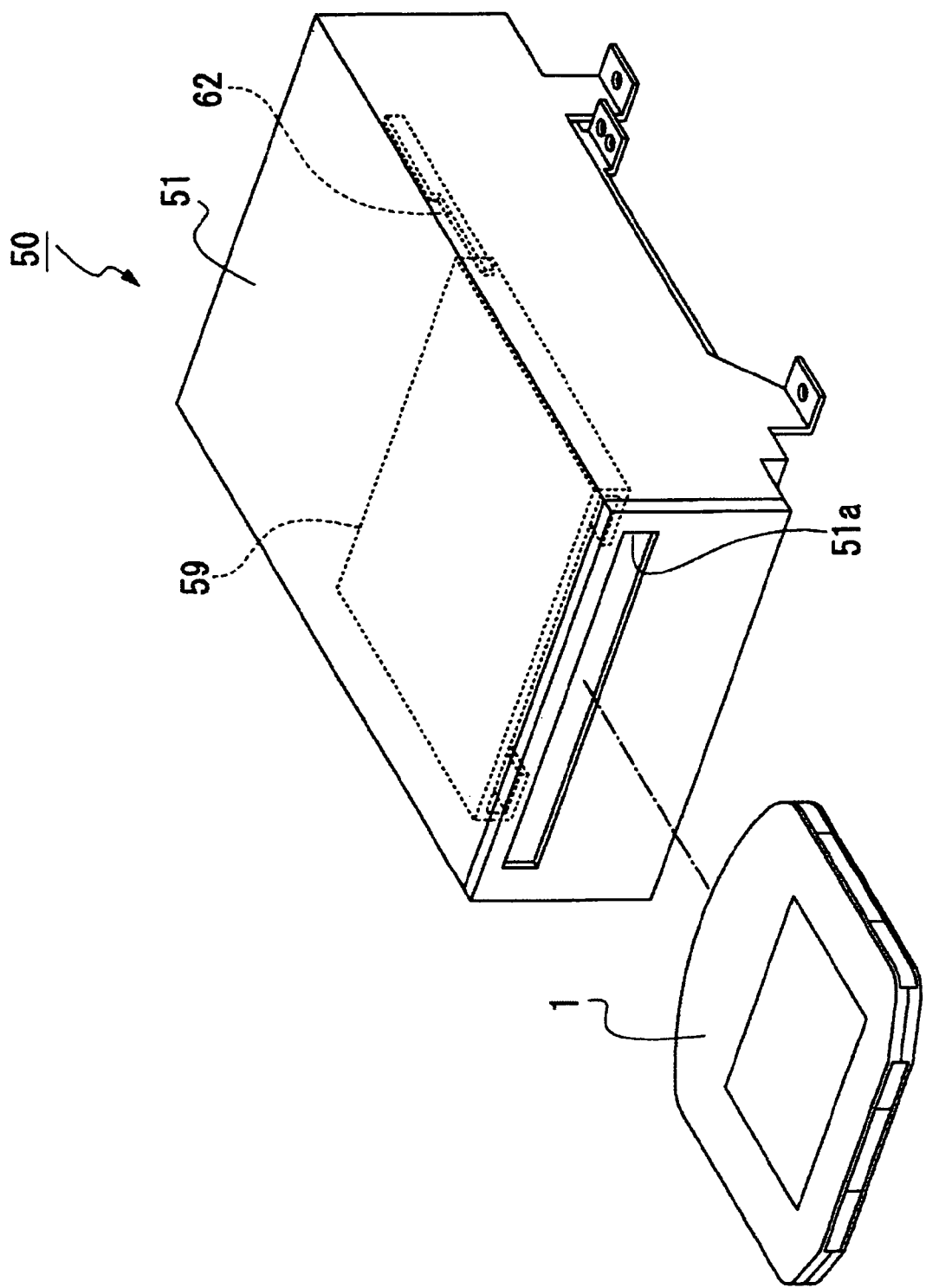
FIG. 1 is a schematic perspective view showing a disk cartridge and a disk drive apparatus of an embodiment of the present invention together-with following FIGS. 2 to 27.
Figure 5:
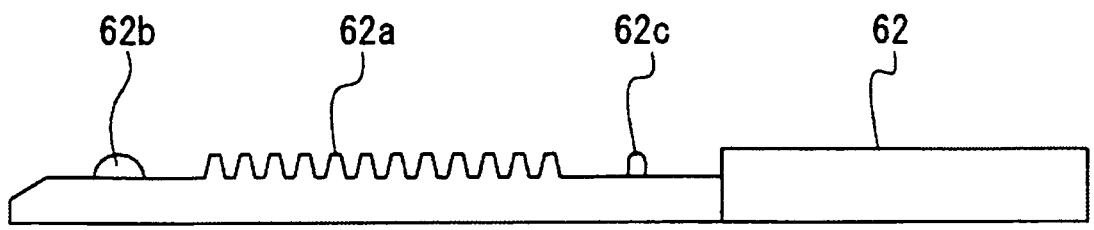
FIG. 5 is an enlarged plan view showing the rack member.
Figure 6:
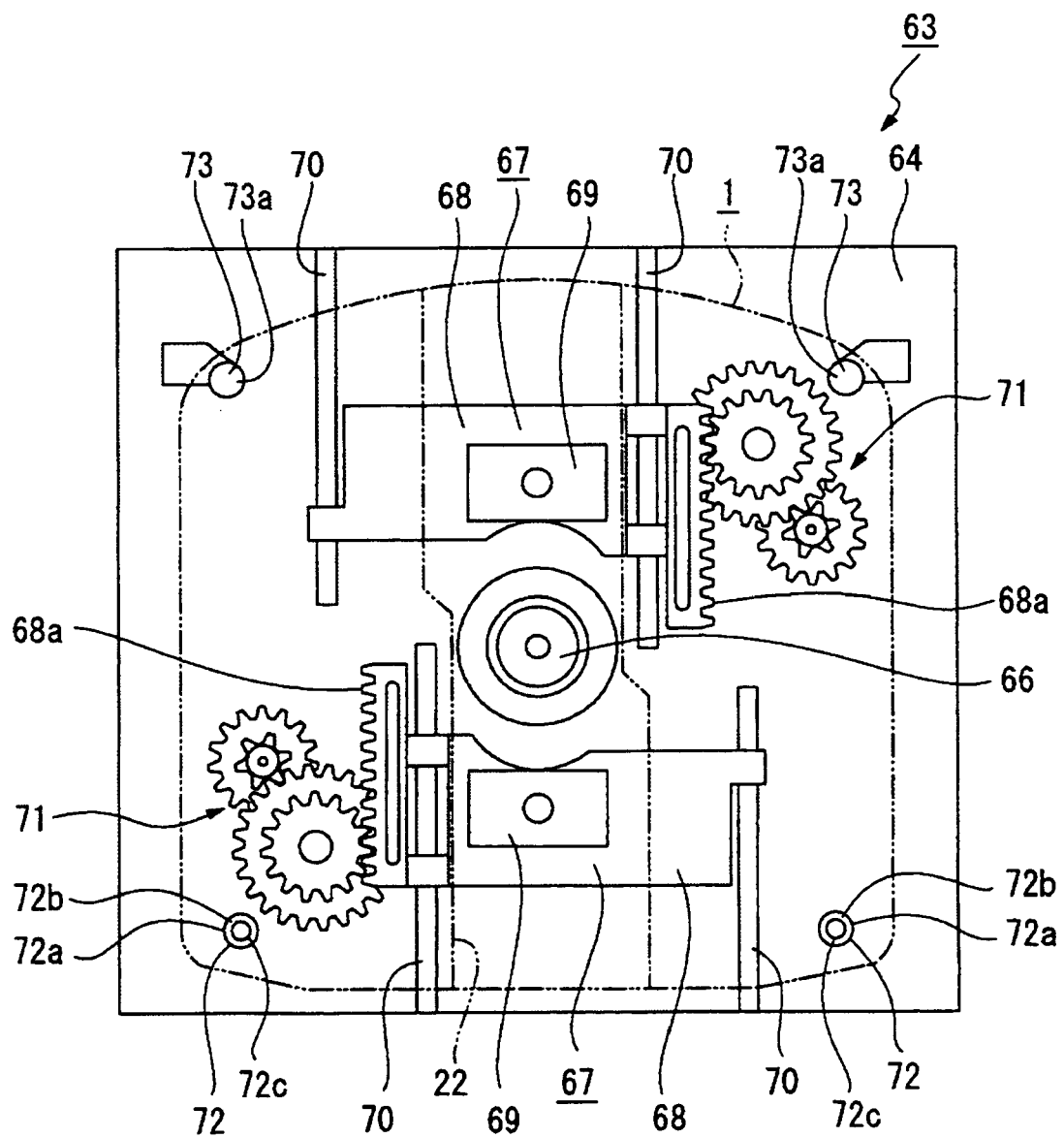
FIG. 6 is a schematic plan view showing a base unit.
Figure 7:
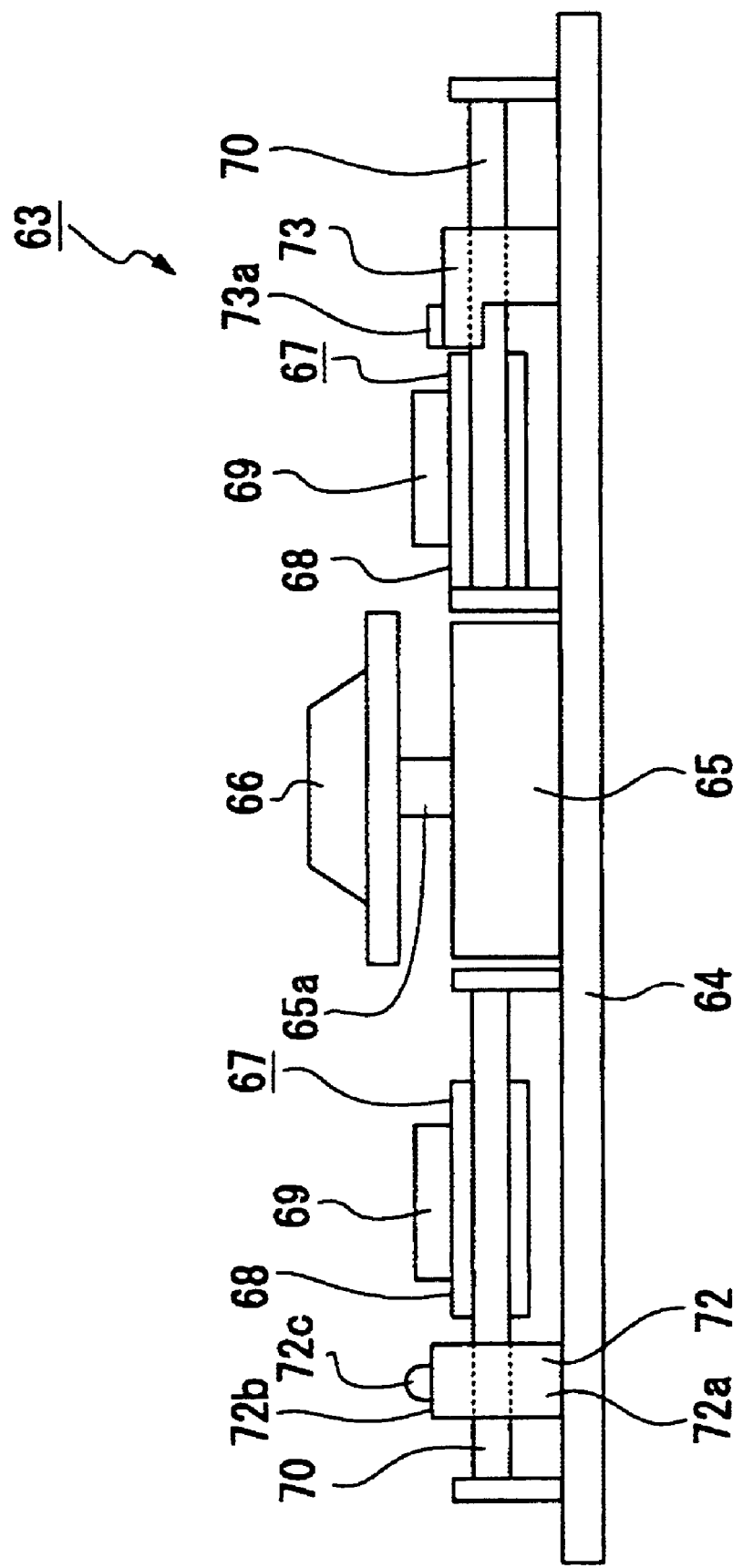
FIG. 7 is a schematic side view showing the base unit.

On the inner surface of one of the side surface portions 59b of the disk holder 59, a rack member 62 is supported movably in the front and rear direction (see FIG. 1). The rack member 62 is, as shown in FIG. 5, formed to be elongated in the front and rear direction, and includes a rack 62a formed on the inner surface of the rack member 62, namely on the surface on the counter side of the side opposed to the side surface portions 59b. At a front position and a rear position of the rack 62a, an operation protruding portion 62b and a lock protruding portion 62c, both protruding inwards, are formed. The rack member 62 is moved in the front and rear direction by a not shown drive mechanism.

In the inside of the disk drive apparatus 50, a base unit 63 is arranged. The base unit 63 is composed of predetermined each unit arranged on an arrangement base 64 (see FIGS. 6 and 7). At substantially the central part of the arrangement base 64, a spindle motor 65 is arranged, and a disk table 66 is fixed to the motor shaft 65a of the spindle motor 65. A not shown magnet is buried in the disk table 66.

On the arrangement base 64, optical pickups 67 are supported movably at a front position and at a rear position with the disk table 66 put between them. Each of the optical pickups 67 includes a movable base 68, and a two-axis actuator 69 supported on the movable base 68. Each of the movable bases 68 is provided with a driving rack 68a. Further on the arrangement base 64, two pairs of two guide axes 70 are arranged separately at a front position and at a rear position with the disk table 66 put between them. The optical pickups 67 are guided by the pairs of the guide axes 70 to move in front and rear directions, respectively. The arrangement base 64 is also provided with speed reducing mechanisms 71 equipped with a plurality of gears. The gears at the last stages of the speed reducing mechanisms 71 are engaged with the driving racks 68a of the movable bases 68, respectively. Consequently, when the speed reducing mechanisms 71 is made to operate by the driving force of the not shown motor, the driving racks 68a are sent into directions according to the rotational direction of the motor. Then, the optical pickups 67 are guided by the guide axes 70 to move forward or backward.

The base unit 63 is provided with locating portions 72 and receiving portions 73. Each of the locating portions 72 is composed of an axis portion 72a protruding into the upper direction at a position near to the front end of the arrangement base 64, and a positioning pin 72c protruding into the upper direction at the central part of the top surface 72b of the axis portion 72a. The locating portions 72 are positioned separately on the left side and the right side.

The receiving portions 73 protrude into the upper direction at positions near to the rear end of the arrangement base 64. The top surfaces of the receiving portions 73 are formed to be receiving surfaces 73a. The positions of the receiving surfaces 73a in the up-and-down direction are set to be the same as those of the top surfaces 72b of the locating portions 72 in the up-and-down direction. The receiving portions 73 are positioned separately on the left side and the right side.

Figure 8:
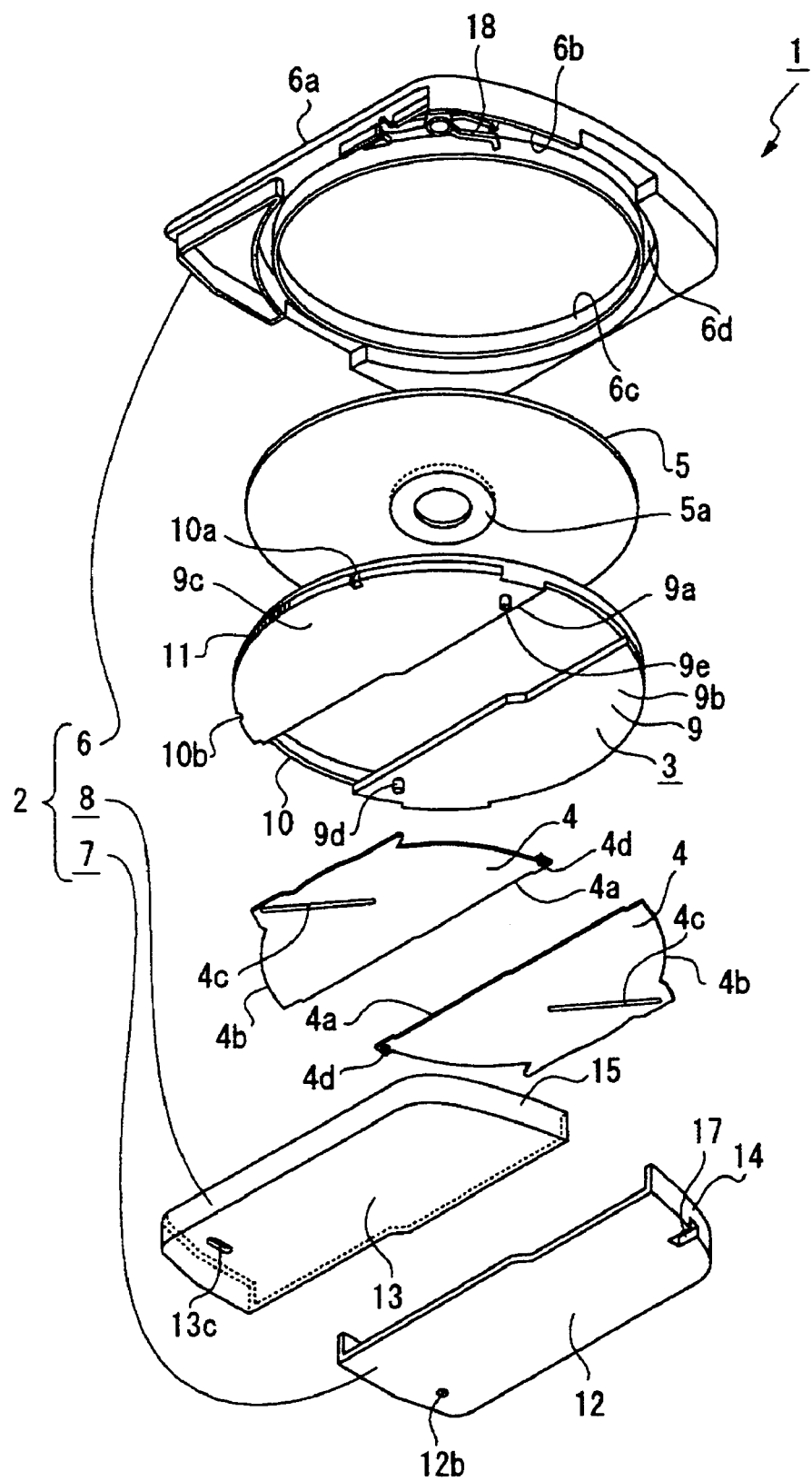
FIG. 8 is an exploded perspective view showing the disk cartridge.

Next, the disk cartridge 1 will be described (see FIGS. 8 to 11). The disk cartridge 1 is formed to be a flat shape. As shown in FIG. 8, the disk cartridge 1 is equipped with an outer shell 2, an inner shell 3, a pair of shutter members 4, and a disk-shaped recording medium 5. The outer shell 2 is composed of a first shell 6 and second shells 7 and 8, which are united as top and bottom (see FIGS. 8 and 9). The outer shell 2 is formed to be almost a quadrilateral shape. A leading end edge 2a of the outer shell 2, namely one end edge on the insertion direction side when the disk cartridge 1 is inserted into the disk drive apparatus 50, is formed in a gentle circular arc. The leading end edge 2a is, as shown in FIG. 10, formed in a circular arc having a reference point 2c as the center positioned at the middle in a right and left direction in the neighborhood of a base end edge 2b, namely one end edge on the counter side of the insertion direction.

Figure 9:
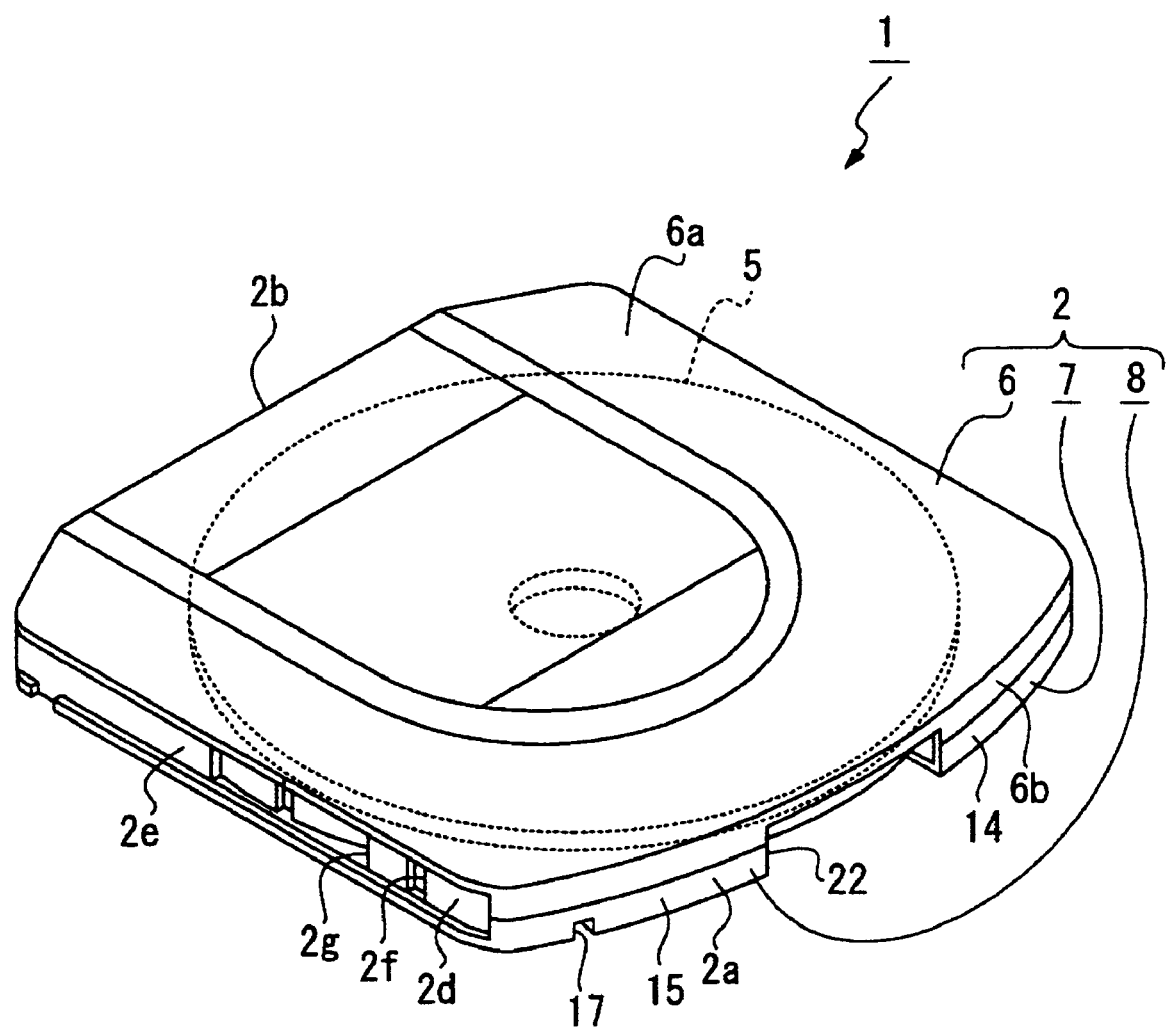
FIG. 9 is a perspective view showing the disk cartridge.
Figure 10:
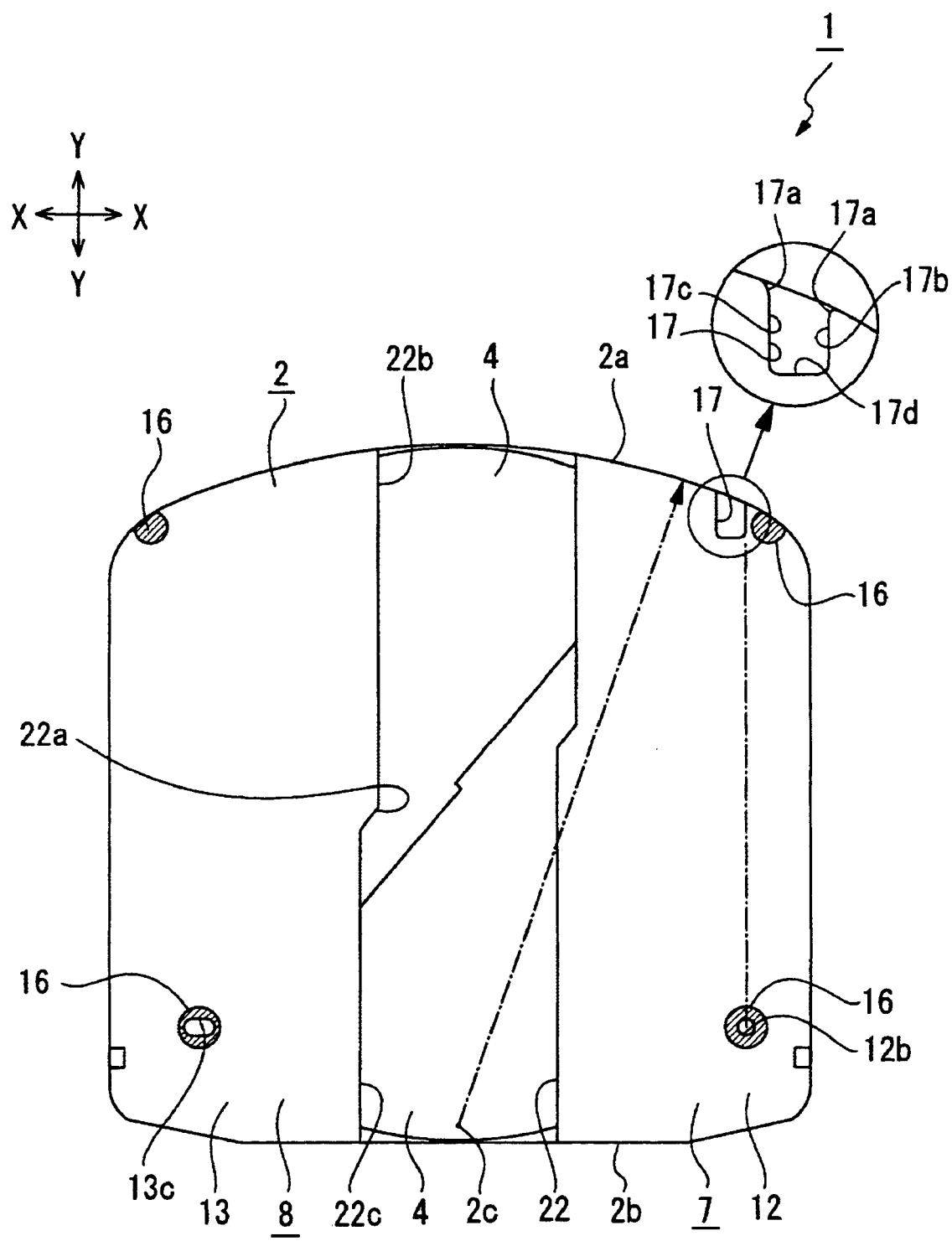
FIG. 10 is a bottom view showing the disk cartridge.

On the right side surface 2d of the outer shell 2, an insertion groove 2e elongated in the insertion direction is formed (see FIG. 9). On the right side surface 2d of the outer shell 2, a protruding portion insertion hole 2f is formed at a position near the leading end edge 2a, and a gear insertion hole 2g is formed at a position nearer to the side of the base end edge 2b than that of the protruding portion insertion hole 2f. The protruding portion insertion hole 2f and the gear insertion hole 2g are opened in the insertion groove 2e.

The first shell 6 is formed in a shallow box being opened downward. The first shell 6 includes a principal surface portion 6a, and a peripheral surface portion 6b provided perpendicularly downward at the peripheral edge of the principal surface portion 6a. The first shell 6 is, as shown in FIG. 8, provided with a circular retainer wall 6c protruding downward at a part of an outer periphery side on the undersurface. A slide groove 6d opened downward along the outer periphery of the retainer wall 6c is formed on the first shell 6.

The inner shell 3 is composed of by integrally forming a flat surface portion 9 formed almost in a circular disc, and a ring portion 10 formed on the outer periphery edge of the flat surface portion 9, to be one body. The ring portion 10 protrudes into the upper direction from the flat surface portion 9.

An opening use notch 9a is formed on the flat surface portion 9. The opening use notch 9a is formed between parts at positions located on almost 180° counter sides on the ring portion 10. Consequently, the flat surface portion 9 is divided into two parts of a first part 9b and a second part 9c with the opening use notch 9a put between them. The undersurfaces of the first part 9b and the second part 9c of the flat surface portion 9 are provided with supporting shafts 9d and 9e protruding downward, respectively.

On the outer surface of the ring portion 10, a gear 11 is formed at a part on the second part 9c side. On the outer surface of the ring portion 10, a lock concave portion 10a and an engage concave portion 10b are formed at positions on the counter sides in the circumferential direction with the gear 11 put between them. The inner shell 3 is rotatably supported by the first shell 6 with the ring portion 10 being inserted into the slide groove 6d of the first shell 6.

The disk-shaped recording medium 5 includes a metal core 5a at the central part thereof. The disk-shaped recording medium 5 is housed in a rotatable state in the space formed between the first shell 6 and the flat surface portion 9 of the inner shell 3. Each of the shutter members 4 is formed in a plate of almost a semi-circle shape. The outer peripheral edge portion of each of the shutter members 4 is composed of a chord side portion 4a and a circular arc side portion 4b. A guide hole 4c elongated in a predetermined direction and a supported hole 4d positioned at one end are formed on each of the shutter members 4.

The supporting shafts 9d and 9e of the inner shell 3 are inserted into the supported holes 4d of the shutter members 4, respectively. Thereby, the shutter members 4 are severally to the shell 3 in a slidably rotatable state around the supporting shafts 9d and 9e, respectively.

Figure 11:
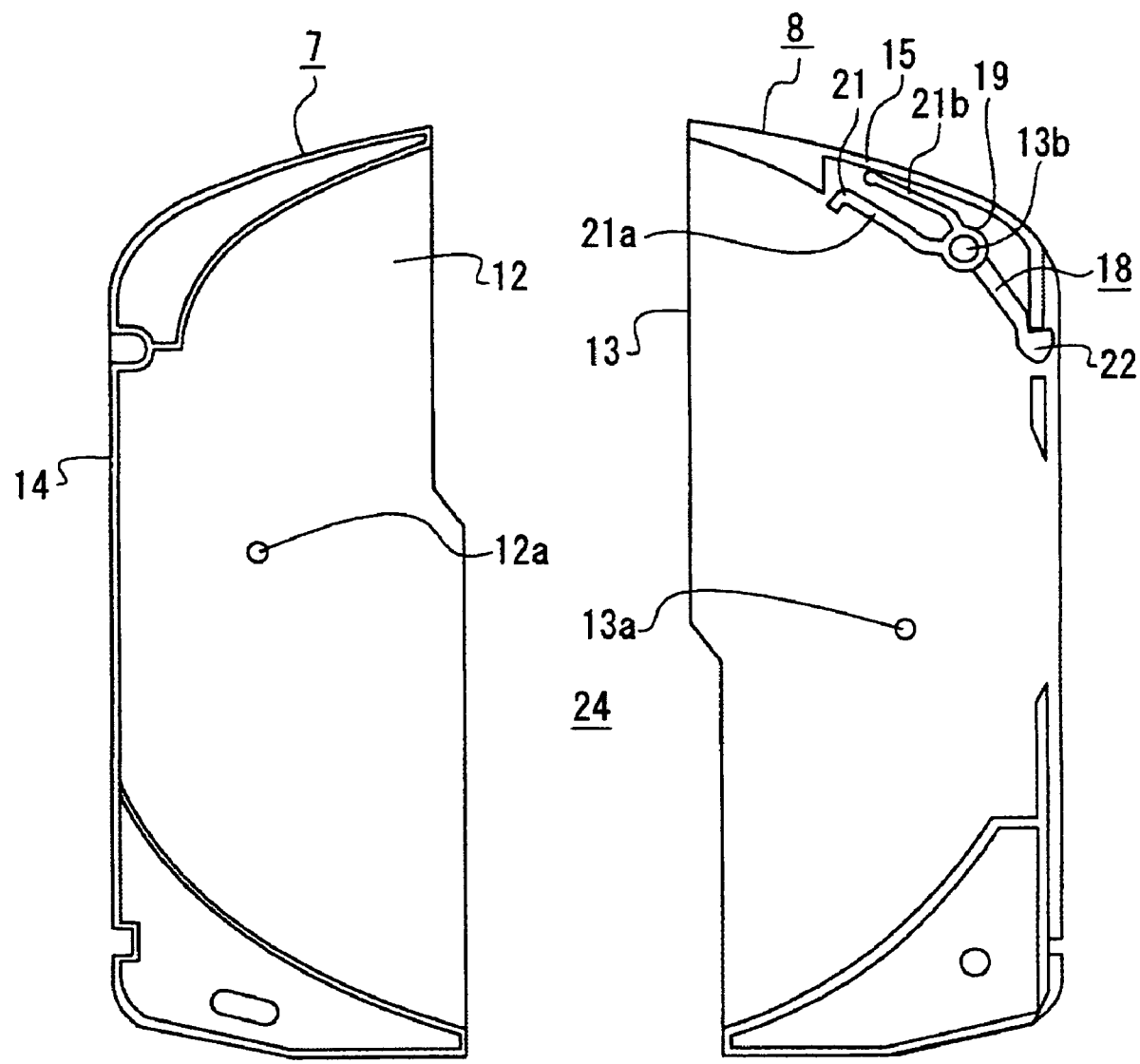
FIG. 11 is a plan view showing second shells.

The second shells 7 and 8 are, as shown in FIGS. 8 and 11, composed of a flat shaped principal surface portions 12 and 13 each formed in almost a rectangle longer than wide, and peripheral surface portions 14 and 15 protruding into the upper direction from the peripheral edge except the peripheral edge at the inside of the principal surface portions 12 and 13, respectively. The flat shaped principal surface portions 12 and 13 and the peripheral surface portions 14 and 15 are formed to be one body, respectively. Guide shafts 12a and 13a are formed on the top surfaces of the principal surface portions 12 and 13 of the second shells 7 and 8, respectively. The second shell 8 positioned on the right side is provided with a lock supporting shaft 13b protruding into the upper direction at a leading end of the principal surface portion 13.

On the undersurfaces of the principal surface portions 12 and 13, positioning holes 12b and 13c opened downward are formed at positions near to the base end edge 2b, respectively (see FIG. 10). The positioning hole 12b is formed in a circular shape. The positioning hole 13c is form in a shape long from side to side in some degree. The positioning holes 12b and 13c are located at the same position in the insertion direction.

Two reference areas 16 are form on each of the second shells 7 and 8. The reference areas 16 are areas to be reference surfaces in height directions (vertical directions) at the time of the insertion of the disk cartridge 1 into the disk drive apparatus 50. The reference areas 16 of the second shell 7 are severally located at a part near to the left end of the leading end of the principal surface portion 12, and in the neighborhood of the opening edge of the positioning hole 12b. The reference areas 16 of the second shell 8 are severally located at a part near to the right end of the leading end of the principal surface portion 13, and in the neighborhood of the opening edge of the positioning hole 13c.

At the leading end of the second shell 7, a discrimination groove 17 opened into the insertion direction and the downward direction is formed (see FIG. 10). The discrimination groove 17 is formed to be longer than wide at a position in the neighborhood of the reference area 16 located at the part near to the left end of the leading end of the principal surface portion 12. At the opening edge of the discrimination groove 17 on the leading end side, introducing parts 17a inclining into directions to be more separated from each other as being closer to the leading end edge 2a are formed. The side surfaces on both sides of the discrimination groove 17 are formed to be a left side positional reference surface 17b and a right side positional reference surface 17c. The interior surface is formed as an interior side positional reference surface 17d. The interval between the left side positional reference surface 17b and the right side positional reference surface 17c is formed to be almost the same or slightly larger than the diameter of the discrimination pin 61 formed on the disk holder 59 of the disk drive apparatus 50.

When the insertion direction of the disk cartridge 1 into the disk drive apparatus 50 is designated as a Y-direction and a direction orthogonal to both of the thickness direction of the disk cartridge 1 and the Y-direction is designated as an X-direction, the position of the left side positional reference surface 17b of the discrimination groove 17 coincides with the center of the positioning hole 12b in the X-direction, as shown in, for example, FIG. 10.

A lock member 18 is supported by the lock supporting shaft 13b of the second shell 8 in a slidably rotatable state (see FIGS. 8 and 11). The lock member 18 is composed of an annular supported portion 19, an operation protruding portion 20 protruding into one direction from the supported portion 19, and a lock protruding portion 21 protruding into almost an opposite direction of the operation protruding portion 20 from the supported portion 19. The annular supported portion 19, the operation protruding portion 20, and the lock protruding portion 21 are formed to be one body. The lock protruding portion 21 is formed into a fork shape. The lock protruding portion 21 is composed of a lock piece portion 21a and an elastic contact piece portion 21b. The lock member 18 is supported by the second shell 8 in a slidably rotatable sate with the lock supporting shaft 13b being inserted into the supported portion 19.

In the state of the lock member 18 supported by the second shell 8, the leading end of the operation protruding portion 20 protrudes from the protruding portion insertion hole 2f of the outer shell 2, and the lock piece portion 21a and the elastic contact piece portion 21b elastically contact or abut with the outer surface of the ring portion 10 of the inner shell 3 and the inner surface of the peripheral surface portion 14 of the second shell 8, respectively.

The second shells 7 and 8 are united with the left end side part and the right end side part of the first shell 6 by, for example, being screwed, respectively. In the state of the second shells 7 and 8 united with the first shell 6, an opening is formed between the second shells 7 and 8, and the opening is used as an opening portion 22 to be opened and closed by the shutter members 4. The opening portion 22 is formed to be elongated in the insertion direction. The central part in a lengthwise direction is used as a table insertion portion 22a through which the disk table 66 is inserted into the disk cartridge 1, and parts on the opposite sides with the table insertion portion 22a between are used as a first operating portion 22b and a second operating portion 22c, respectively. The first and the second operating portions 22b and 22c are transmission portions of laser beams irradiated from the optical pickups 67. The opening portion 22 is formed to have almost the same size and almost the same shape as those of the opening use notch 9a of the inner shell 3.

In the state of the second shells 7 and 8 united with the first shell 6, the guide shafts 12a and 13a formed on the principal surface portions 12 and 13 of the second shells 7 and 8 are slidably engaged with the guide holes 4c of the shutter members 4, respectively.

In the following, operations of the disk cartridge 1 at the time of being inserted into the disk drive apparatus 50 through the insertion opening 51a will be described (see FIGS. 12 to 22).

First, the state of the disk cartridge 1 before the insertion thereof into the insertion opening 51a will be described (see FIG. 12). The lock piece portion 21a of the lock member 18 is engaged with the lock concave portion 10a of the ring portion 10 of the inner shell 3. Consequently, the inner shell 3 is locked at an initial position, at which the opening use notch 9a is inclined to the opening portion 22 by a predetermined angle, and thereby the rotation of the inner shell 3 to the outer shell 2 is regulated.

The guide shafts 12a and 13a of the second shells 7 and 8 are engaged with the guide holes 4c of the shutter members 4 at their ends on one side, namely the ends on the side of the circular arc side portions 4b, respectively. Consequently, the chord side portions 4a of the shutter members 4 are superposed to be held at a closed position. The opening portion 22 of the outer shell 2 is closed because the shutter members 4 are at their closed positions.

Figure 13:
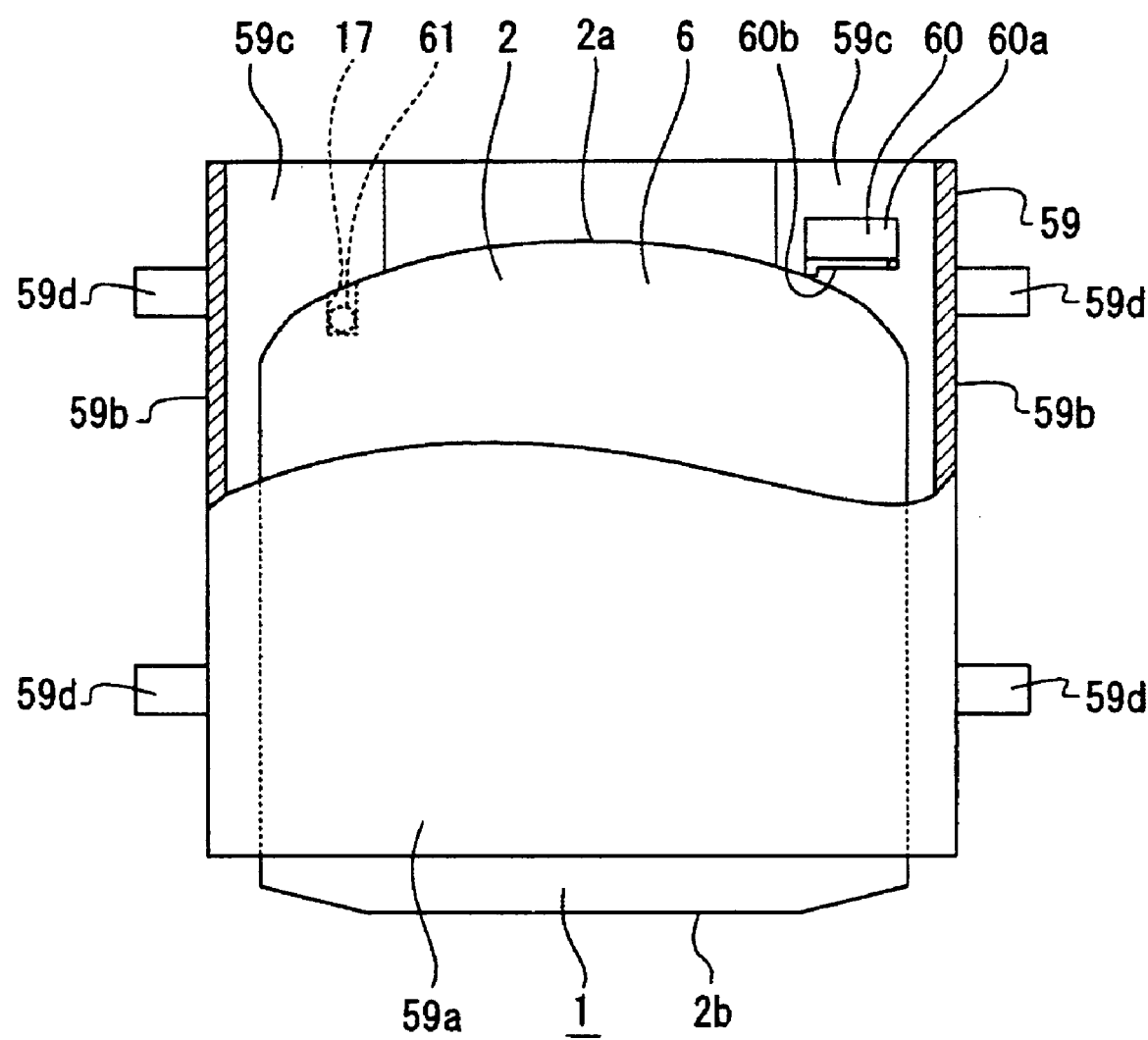
FIG. 13 is a plan view showing a state in which the disk cartridge is inserted into the insertion opening and a discrimination pin is inserted into a discrimination groove with a part of a side surface portion being broken.
Figure 14:
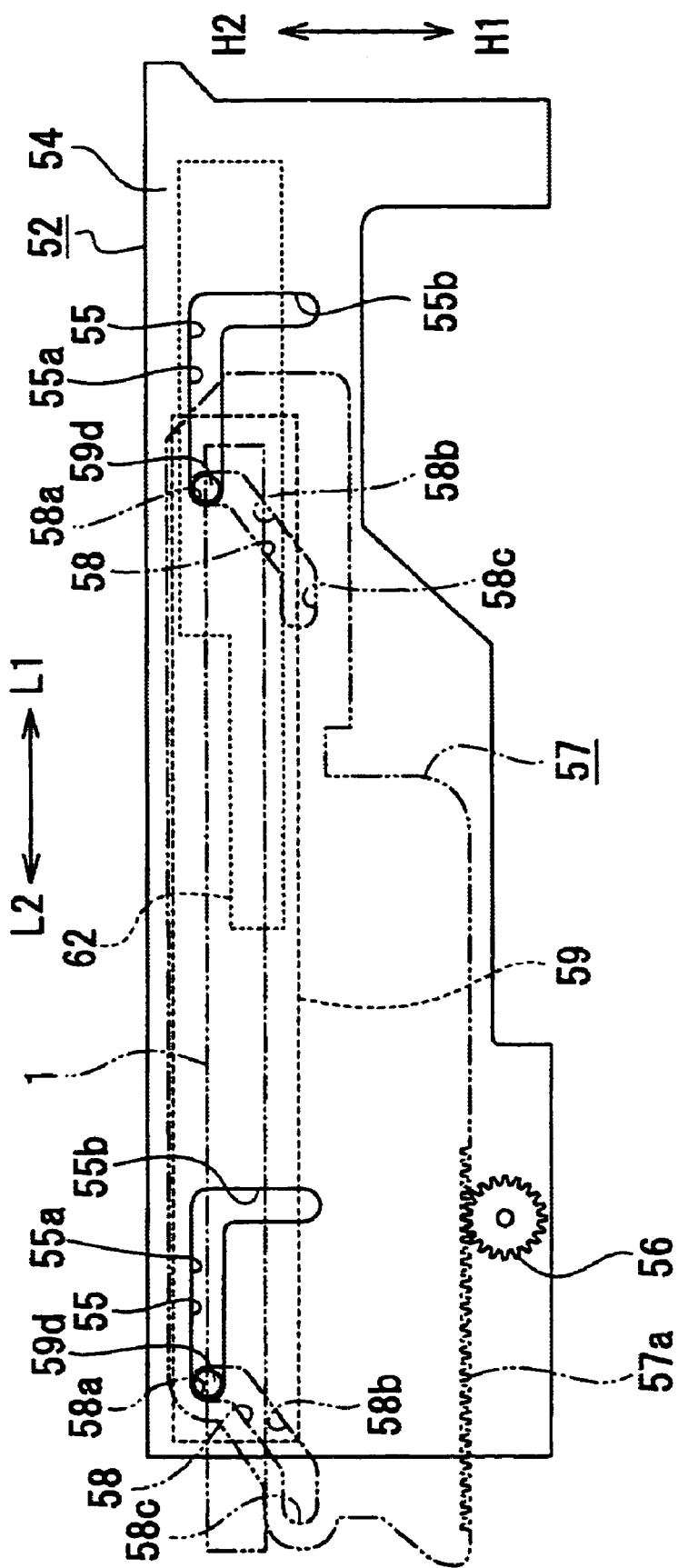
FIG. 14 is a schematic side view showing a state of the disk cartridge inserted from the insertion opening to a holding position.

As the disk cartridge 1 is being inserted into the inside of the disk drive apparatus 50 through the insertion opening 51a, the disk cartridge 1 is moved along the side surface portions 59b of the disk holder 59, and the discrimination pin 61 formed on the disk holder 59 is inserted into the discrimination groove 17 formed on the outer shell 2 (see FIG. 13). Because the introducing parts 17a inclining into directions to be more separated from each other as being closer to the leading end edge 2a are formed at the opening edge portion of the discrimination groove 17, the discrimination pin 61 is guided by the introducing parts 17a to be certainly and smoothly inserted into the discrimination groove 17.

After the discrimination pin 61 is inserted into the discrimination groove 17, the disk cartridge 1 reaches a holding position where the disk cartridge 1 is held by the disk holder 59 (see FIG. 14), and it is discriminated that the inserted disk cartridge is the professional use disk cartridge 1. In the state in which the disk cartridge 1 has reached the holding position, a part of the disk cartridge 1 on the side of the base end edge 2b protrudes to the outside from the insertion opening 51a.

Incidentally, the discrimination pin 61 is exemplified as means for being inserted into the discrimination groove 17 in the above description, but the means for being inserted into the discrimination groove 17 is not limited to the discrimination pin 61. For example, an insertion piece formed by cutting a part of the disk holder 59 to raise the cut part or an insertion portion that is made of a resin to be attached to the disk holder 59 also can be used in place of the discrimination pin 61.

Use of such an insertion piece or an insertion portion enables the formation of the means for being inserted into the insertion groove 17 at a low cost, and then enables the achievement of reducing the manufacturing cost of the disk drive apparatus 50. In the state in which the disk cartridge 1 has reached the holding position, the part of the disk cartridge 1 on the side of the base end edge 2b protrudes from the insertion opening 51a to the outside.

Incidentally, a disk cartridge meeting with the standards for consumer use has no discrimination groove 17 formed thereon. Consequently, when such a disk cartridge meeting with the standards for consumer use is inserted from the insertion opening 51a, the disk cartridge is contacted with the discrimination pin 61, and does not reach the holding position. Consequently, it is discriminated that the inserted disk cartridge is a disk cartridge meeting with the standards for consumer use. Because a part of the disk cartridge meeting with the standards for consumer use protrudes to the outside from the insertion opening 51a at this time, the disk cartridge meeting with the standards for consumer use inserted by mistake can be taken out from the disk drive apparatus 50 by being pulled out.

The insertion of the discrimination pin 61 into the discrimination groove 17 regulates the position of the disk cartridge 1 in the right and left direction (the X-direction shown in FIG. 10) in the disk holder 59 with the left side positional reference surface 17b and the right side positional reference surface 17c. Moreover, the insertion of the discrimination pin 61 into the discrimination groove 17 and the contact of the discrimination pin 61 with the interior side positional reference surface 17d regulates the position of the disk cartridge 1 in the front and rear direction (the Y-direction shown in FIG. 10) in the disk holder 59 with the interior side positional reference surface 17d. Consequently, the discrimination pin 61 also functions as a positioning pin for regulating the position of the disk cartridge 1 in the disk holder 59, and the discrimination groove 17 is also functions as a positioning groove for regulating the position of the disk cartridge 1 in the disk holder 59.

Incidentally, the above description concerns the example of the discrimination of the inserted disk cartridge 1 for professional use at the time of the insertion of the discrimination pin 61 into the discrimination groove 17 and the execution of the positioning of the professional use disk cartridge 1 in the X, Y-directions at the same time. However, for example, only the discrimination of the professional use disk cartridge 1 regarding the inserted disk cartridge may be performed when the discrimination pin 61 is inserted into the discrimination groove 17. Alternatively, only the discrimination of the professional use disk cartridge 1 and the positioning only in the X-direction may be performed. Furthermore, only the discrimination of the professional use disk cartridge 1 and the positioning only in the Y-direction may be performed.

When the discrimination pin 61 is inserted into the discrimination groove 17, the detection arm 60b of the detection sensor 60 is pressed by the leading end edge 2a of the disk cartridge 1 to be rotated (see FIG. 13), and thereby the insertion of the disk cartridge 1 up to the holding position is detected by the detection sensor 60. When the insertion of the disk cartridge 1 up to the holding position is detected by the detection sensor 60, the rotation of the drive motor is started. The rotation of the drive motor rotates the drive gears 56 to slide the cam sliders 57 into the L1 direction shown in FIG. 14.

When the cam sliders 57 are slid into the L1 direction, the guided pins 59d are moved into the L1 direction in the horizontal portions 55a of the guide holes 55 of the fixed frame 52, and the disk holder 59 holding the disk cartridge 1 is moved into the L1 direction. When the guided pins 59d reach the rear ends of the horizontal portions 55a, the disk holder 59 reaches at a retracted position (see FIG. 15), and the rotation of the drive gears 56 are temporarily stopped. When the disk holder 59 reaches the retracted position, the whole of the disk cartridge 1 is inserted in the disk drive apparatus 50.

Figure 15:
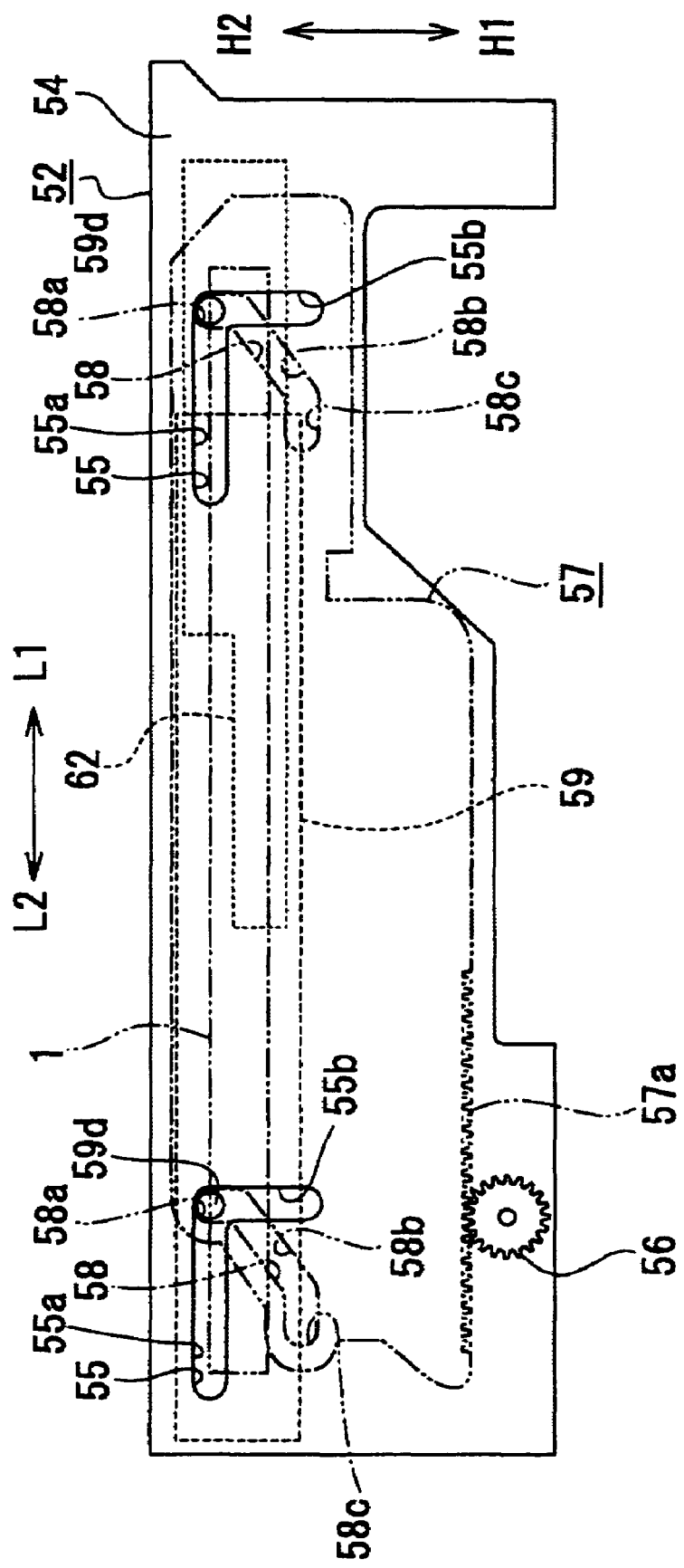
FIG. 15 is a schematic side view showing a state in which the disk holder has moved in a horizontal direction continuously to the state shown in FIG. 14.
Figure 16:
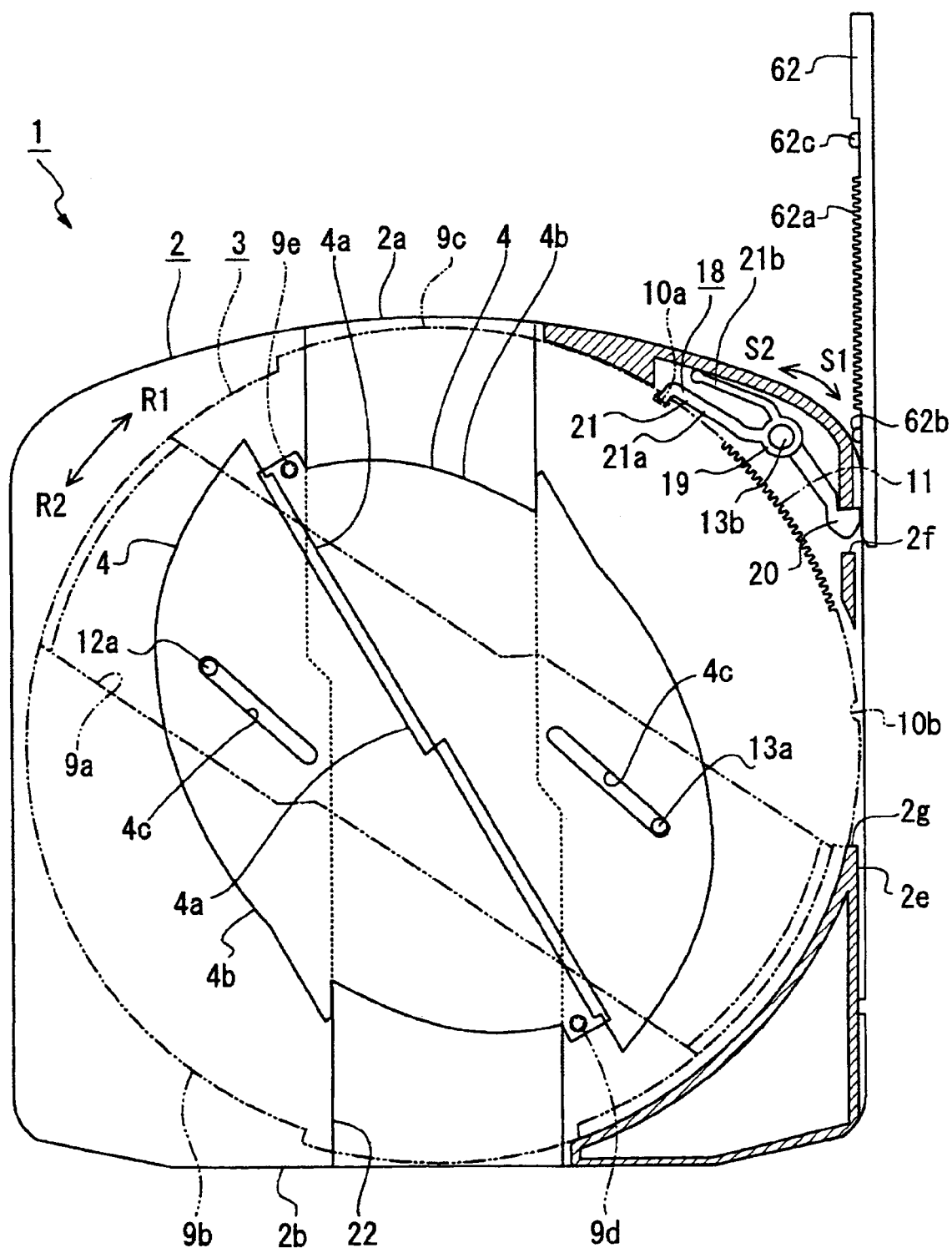
FIG. 16 is a schematic plan view showing a state of a rack member just after a start of a movement thereof with a part of an outer shell being as a cross section continuously to the state shown in FIG. 15.

Successively, the movement of the rack member 62 into the L2 direction shown in FIG. 15 is started. When the rack member 62 is moved into the L2 direction, the operation protruding portion 62b and the rack 62a are sequentially inserted into the insertion groove 2e of the outer shell 2 of the disk cartridge 1 (see FIG. 16).

Figure 17:
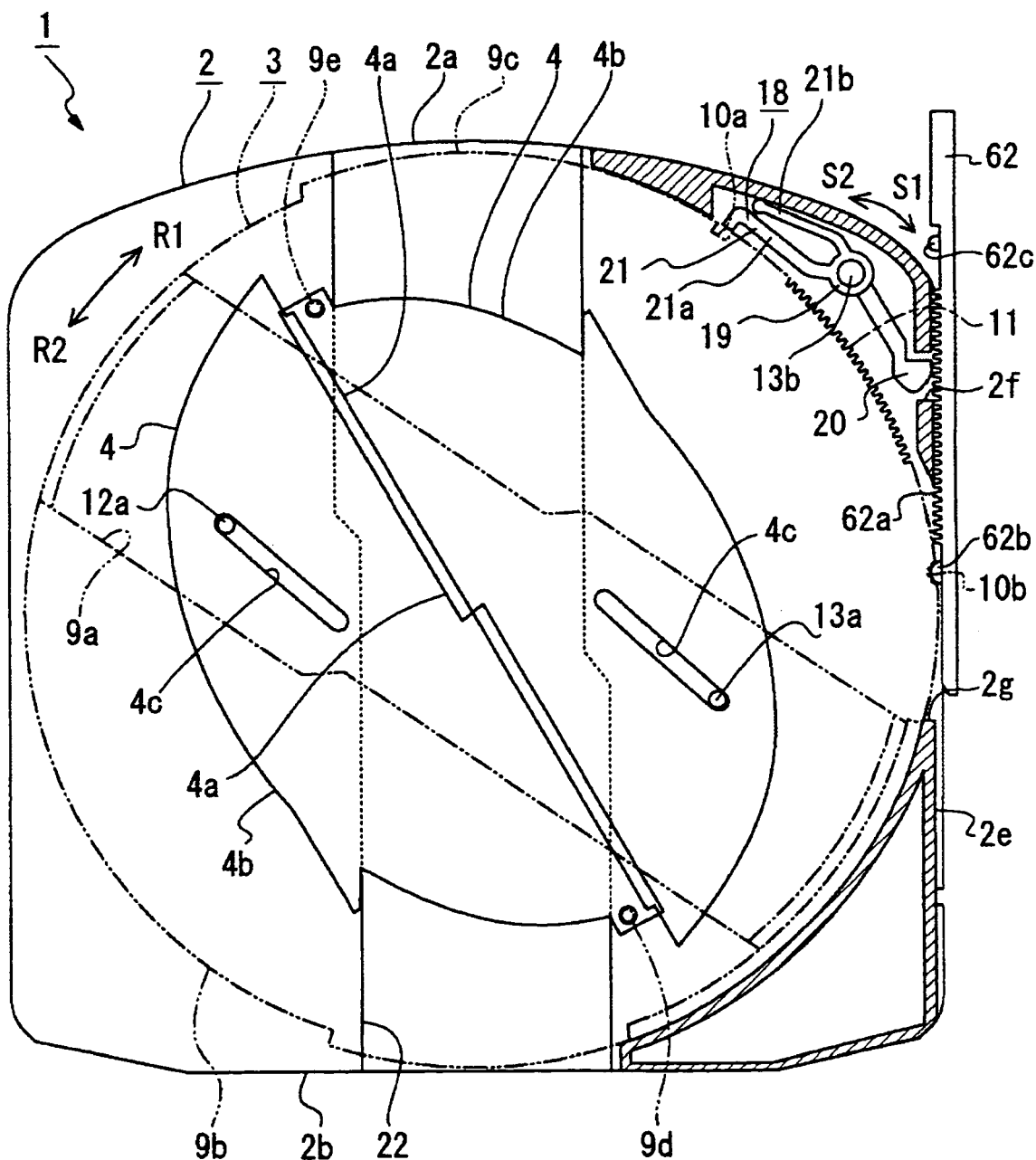
FIG. 17 is a schematic plan view showing a state in which the rack member is moved and the lock of an inner shell by a lock member is released with a part of an outer shell being as a cross section continuously to the state shown in FIG. 16.

When the rack member 62 is moved into the L2 direction and the operation protruding portion 62b and the rack 62a are inserted into the insertion groove 2e, the operation protruding portion 20 of the lock member 18 is pressed into the inside of the outer shell 2 by the rack 62a, and at the same time the operation protruding portion 62b is inserted into the engage concave portion 10b of the inner shell 3 to be engaged with the engage concave portion 10b, as shown in FIG. 17.

Figure 12:
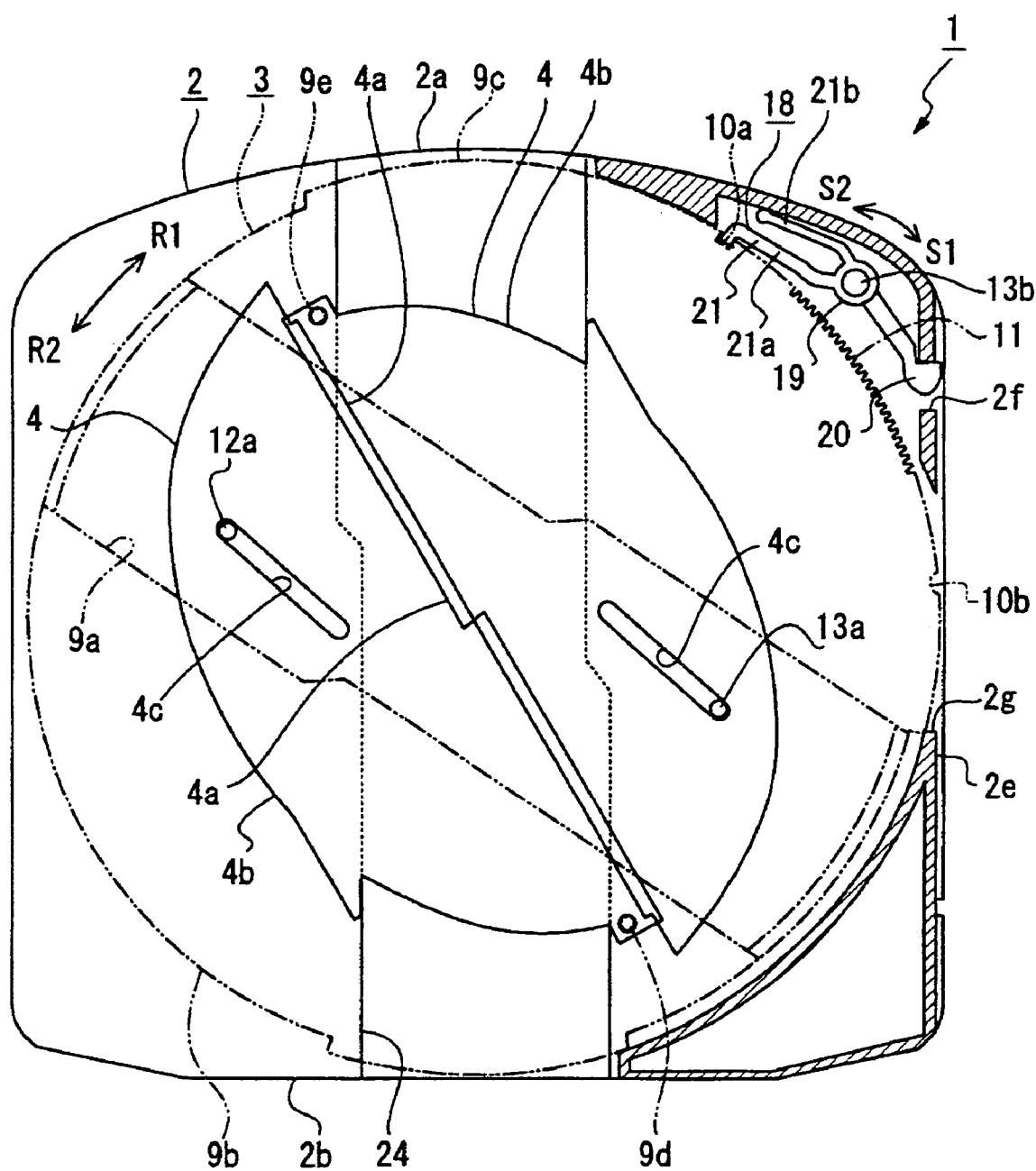
FIG. 12 is a schematic plan view showing a state of the disk cartridge before the disk cartridge is inserted into the insertion opening in an action of the disk cartridge at the time of being inserted into the insertion opening of the disk drive apparatus, which operation is also shown in FIGS. 13 to 22.

When the operation protruding portion 20 presses into the inside of the outer shell 2 by the rack 62a, the lock member 18 is turned into an S1 direction shown in FIG. 12. Then, the lock piece portion 21a is separated from the lock concave portion 10a, and thereby the locking of the inner shell 3 with the lock member 18 is released.

Figure 18:
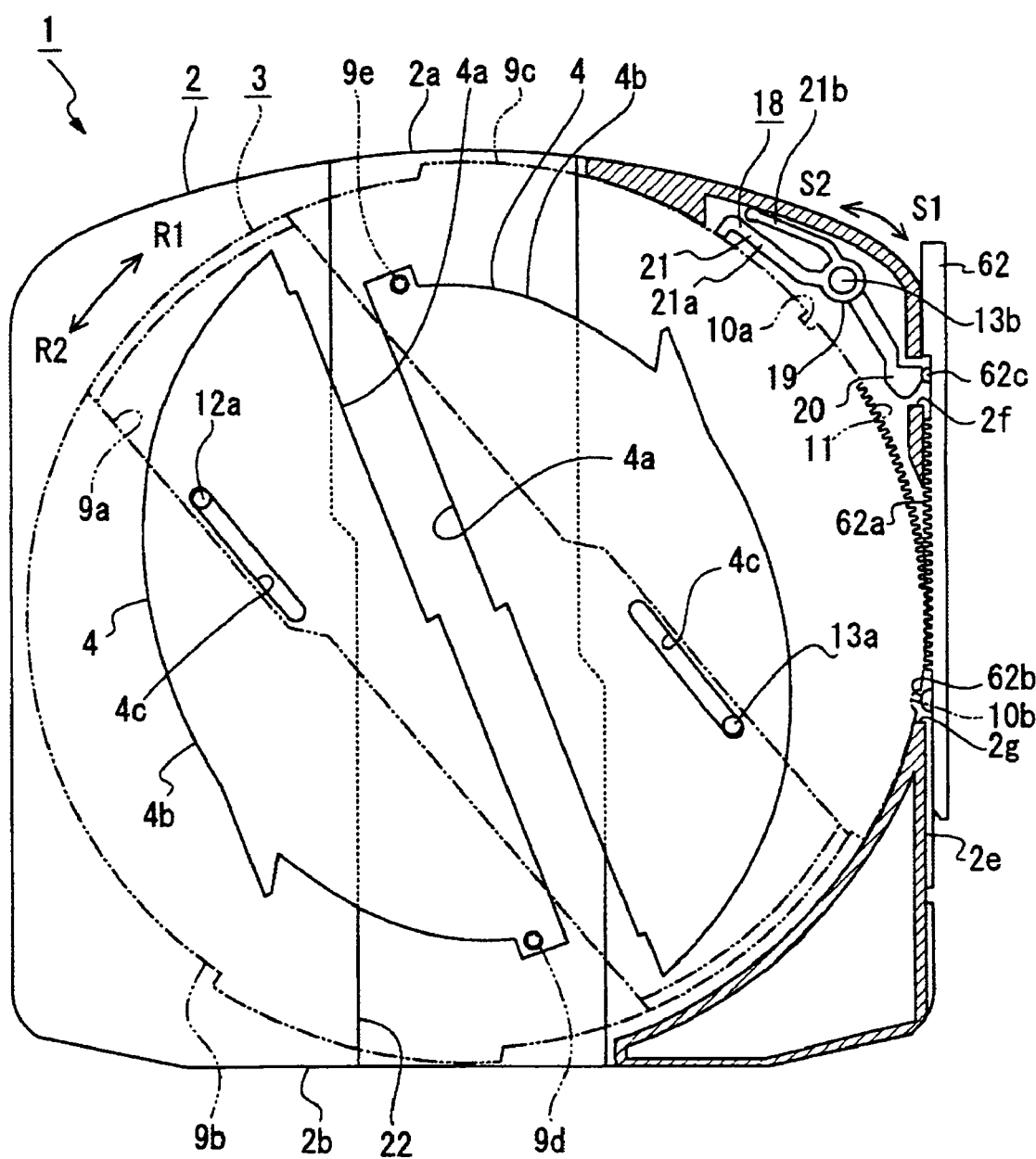
FIG. 18 is a schematic plan view showing a state in which the rack member is moved and the inner shell is rotated with the outer shell being as a cross section continuously to the state shown in FIG. 17.

When the rack member 62 is successively moved into the L2 direction, the inner shell 3 is rotated in an R1 direction shown in FIG. 17 as the operation protruding portion 62b moves, and then the rack 62a is engaged with the gear 11 of the inner shell 3 (see FIG. 18). At this time, the shutter members 4 accompany the rotation of the inner shell 3 to rotate into the R1 direction.

When the rack member 62 is further moved into the L2 direction, the engagement of the operation protruding portion 62b with the engage concave portion 10b is released. However, because the rack 62a is engaged with the gear 11, the inner shell 3 accompanies the movement of the rack member 62 to rotate into the R1 direction furthermore. At this time, the guide shafts 12a and 13a relatively move in the guide holes 4c of the shutter members 4, respectively. Then, the shutter members 4 are rotated against the inner shell 3. Consequently, the chord side portions 4a of the shutter members 4 are being separated from each other.

Figure 19:
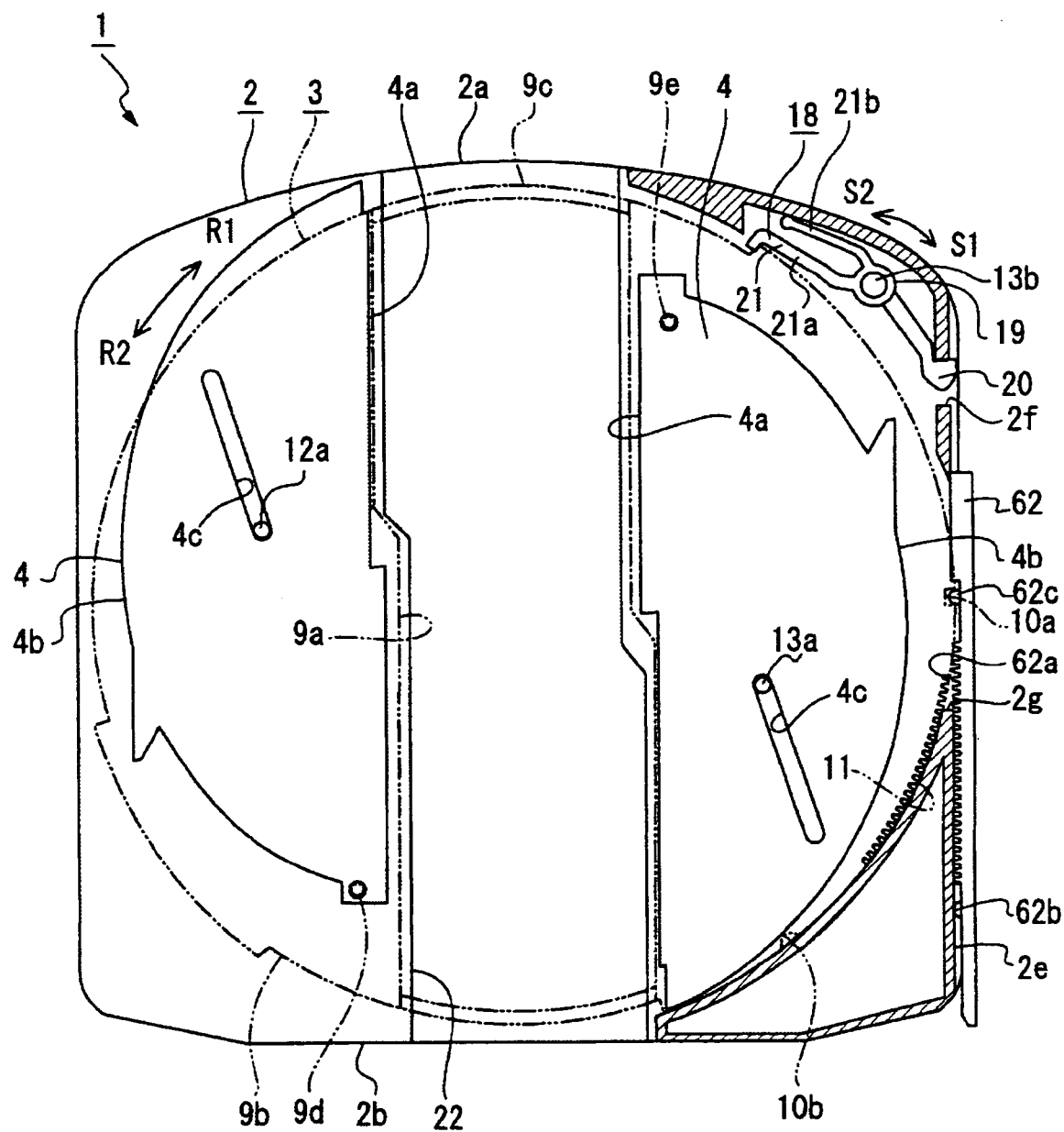
FIG. 19 is a schematic plan view showing a state in which the rack member is moved and an opening portion is opened with the outer shell being as a cross section continuously to the state shown in FIG. 18.

Successively, when the rack member 62 is moved into the L2 direction, the lock protruding portion 62c is engaged with the lock concave portion 10a of the inner shell 3, and the movement of the rack member 62 into the L2 direction is stopped (see FIG. 19). In the state in which the movement of the rack member 62 into the L2 direction is stopped, the inner shell 3 reaches a stop position, and the opening use notch 9a coincides with the opening portion 22. At this time, the guide shafts 12a and 13a of the second shells 7 and 8 are engaged with the ends of the guide holes 4c on the side of the chord side portions 4a, respectively, and the whole of the shutter members 4 are severally positions between the first part 9b of the inner shell 3 and the second shell 7, and between the second part 9c of the inner shell 3 and the second shell 8, respectively. Consequently, the whole of the opening portion 22 is opened and a part of the disk-shaped recording medium 5 is exposed.

When the movement of the rack member 62 into the L2 direction is stopped and the whole of the opening portion 22 is opened, the rotation of the drive gears 56 are again started. When the drive gears 56 are rotated, the cam sliders 57 are again slid in the L1 direction shown in FIG. 15.

Figure 20:
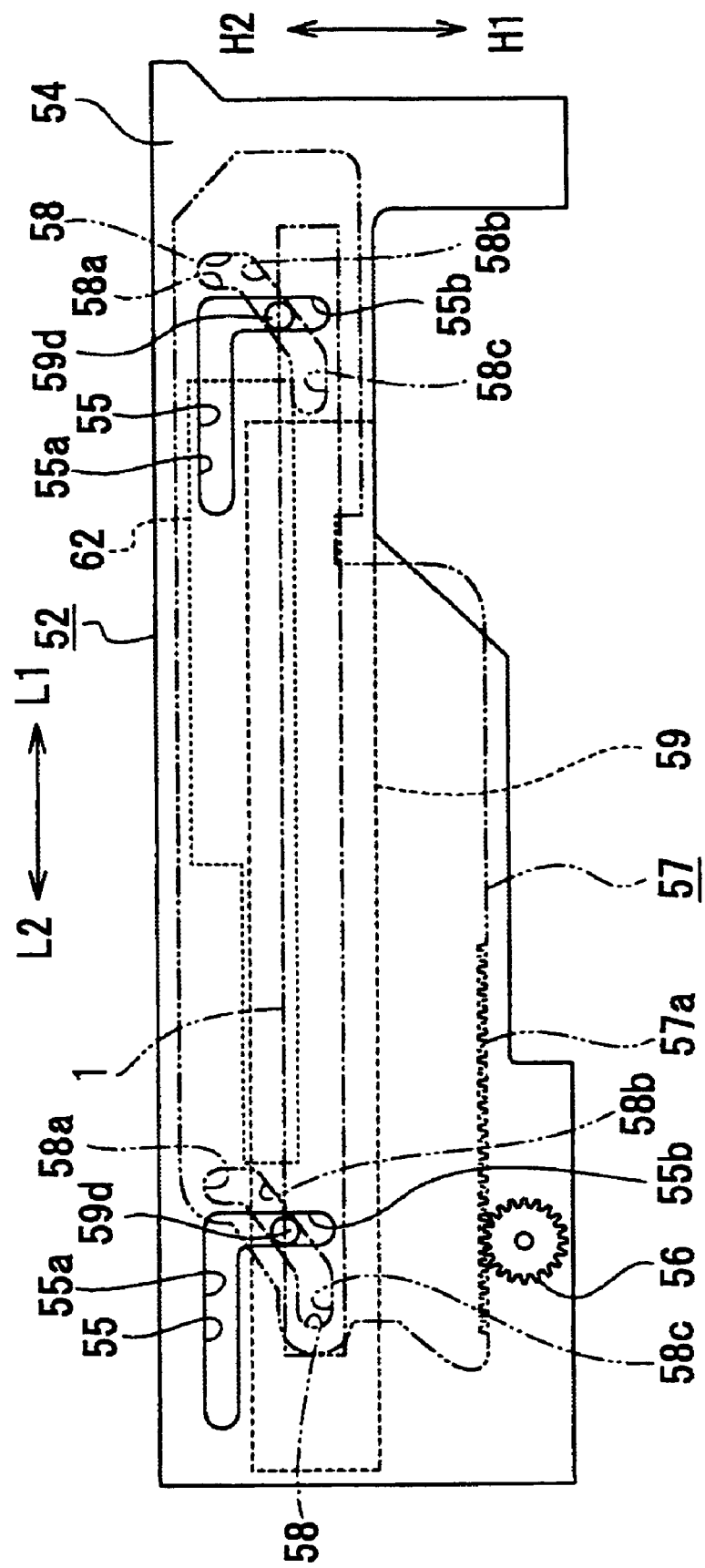
FIG. 20 is a schematic side view showing a state of the disk holder which is descending.
Figure 21:
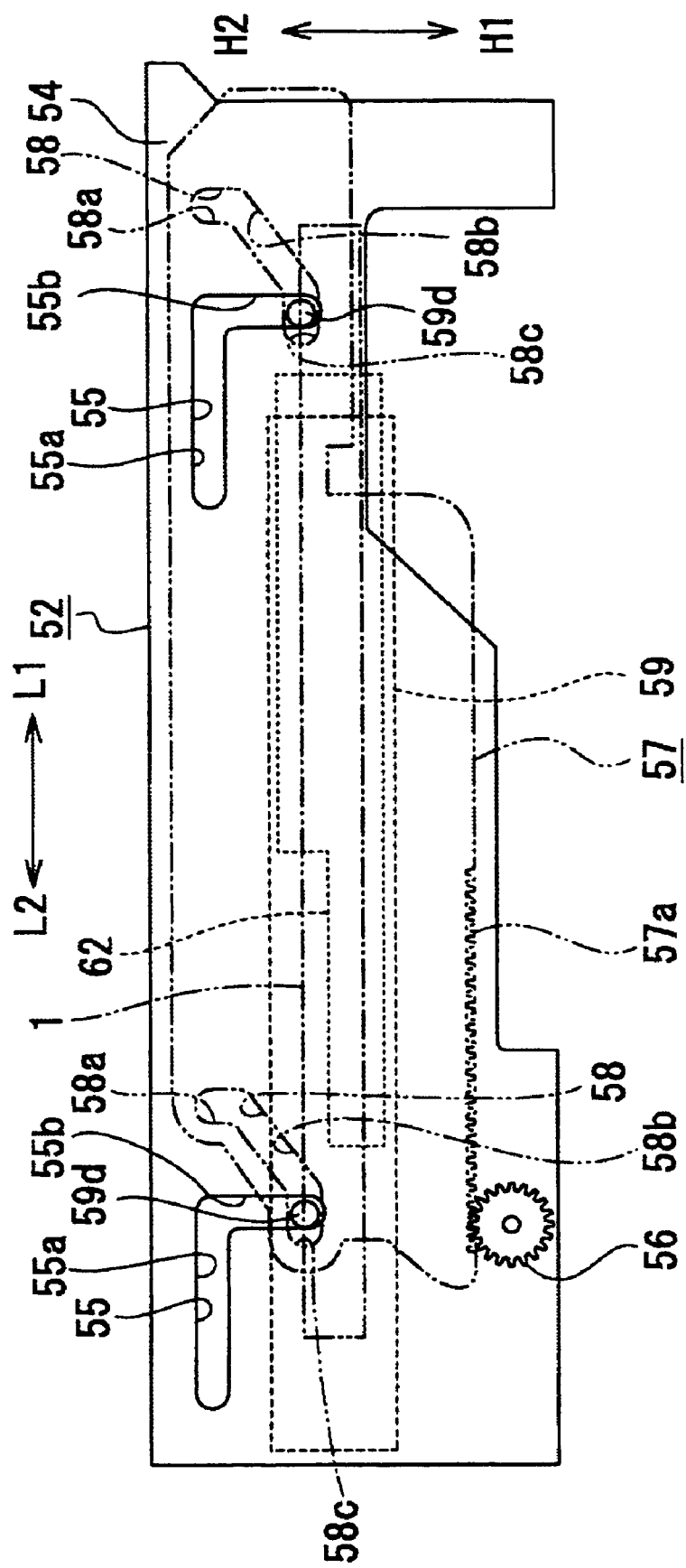
FIG. 21 is a schematic side view showing a state of the disk holder which descends to be moved to a mounting position.
Figure 22:
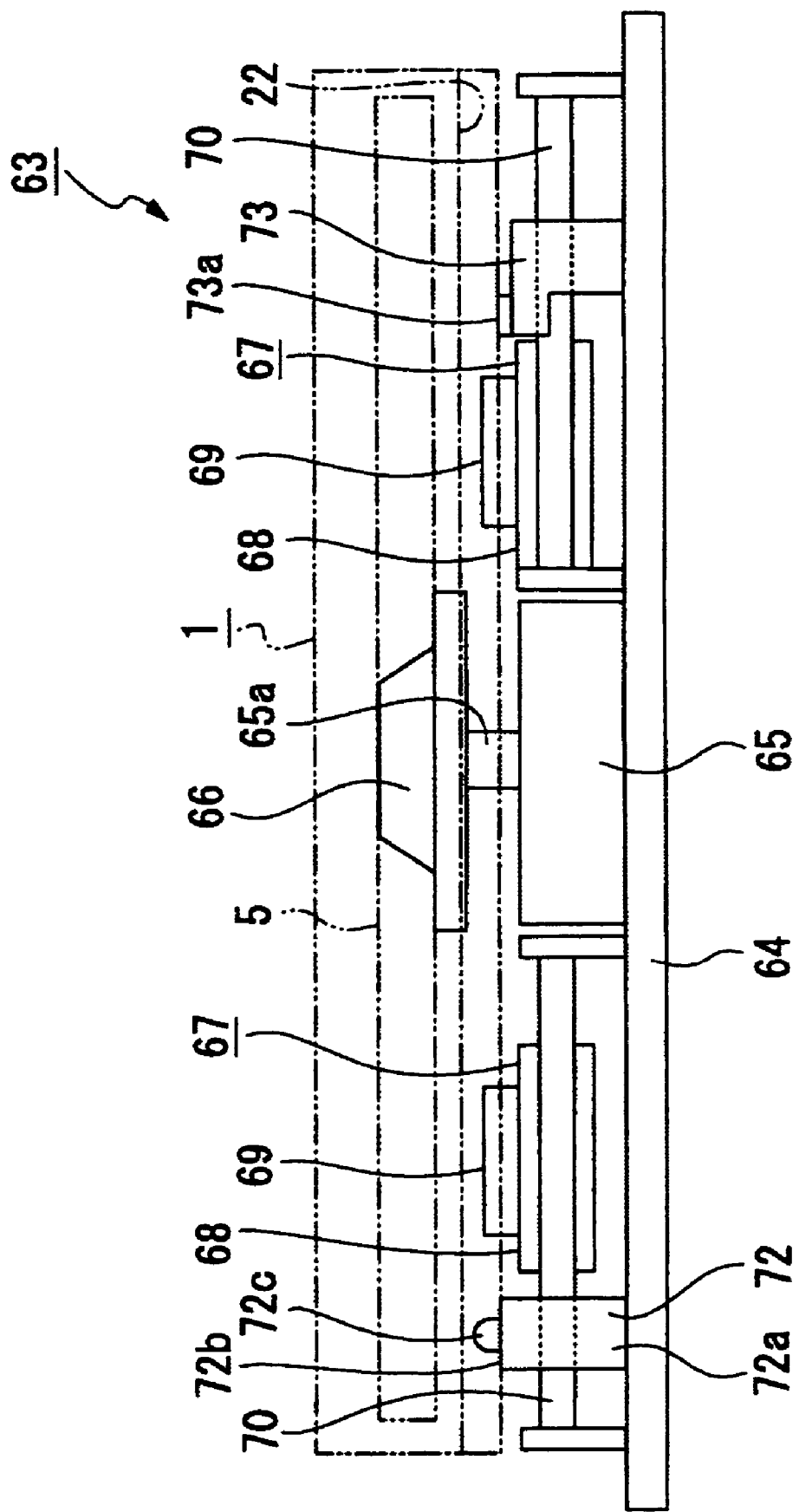
FIG. 22 is a schematic side view of a state of the disk-shaped recording medium mounted on the disk table.

When the cam sliders 57 are slid into the L1 direction, the guided pins 59d are moved in the vertical portions 55b of the guide holes 55 of the fixed frame 52 and in the cam inclining portions 58b of the cam holes 58 of the cam sliders 57, and the disk holder 59 holding the disk cartridge 1 is moved in an H1 direction (downward) shown in FIG. 15 together with the rack member 62 in one body (see FIG. 20).

Successively, when the cam sliders 57 are slid into the L1 direction and the guided pins 59d reaches the lower ends of the vertical portions 55b and the lower side holding portions 58c of the cam holes 58, the disk holder 59 reaches at the mounting position (see FIG. 21), and the rotation of the drive motor is stopped. When the disk holder 59 reaches at the mounting position, the disk table 66 is inserted from the table insertion portion 22a of the opening portion 22 of the outer shell 2 (see FIG. 22). Then, the core 5a of the disk-shaped recording medium 5 is attracted by the magnet of the disk table 66, and the disk-shaped recording medium 5 is mounted on the disk table 66. At this time, the positioning pins 72c of the locating portions 72 formed on the base unit 63 are inserted into the positioning holes 12b and 13c of the disk cartridge 1, respectively.

In the state in which the disk holder 59 reaches the mounting position, the disk cartridge 1 is downward energized by the presser bar spring formed in the inside of the disk holder 59, and the reference areas 16 of the disk cartridge 1 are pressed against the top surfaces 72b of the axis portions 72a of the locating portions 72 and the receiving surfaces 73a of the receiving portions 73, respectively. Moreover, the optical pickups 67 are positioned correspondingly to the first operating portion 22b and the second operating portion 22c of the opening portion 22, respectively (see FIG. 22).

When the positioning pins 72c are inserted into the positioning holes 12b and 13c, respectively, the positioning of the disk cartridge 1 in the X, Y-directions shown in FIG. 10, namely in the front and rear direction and in the right and left direction is performed. The respective press of the reference areas 16 against the top surfaces 72b and the receiving surfaces 73a result in the positioning of the disk cartridge 1 in the height direction (up-and-down direction)

When the disk-shaped recording medium 5 is mounted on the disk table 66, the disk-shaped recording medium 5 rotates as the disk table 66 rotates, and the recording or the reproducing of an information signal to or from the disk-shaped recording medium 5 is performed by the driving of the optical pickups 67. Incidentally, one or both of the optical pickups 67 are driven in accordance with a request of a user. The driving of both the optical pickups 67 makes it possible to achieve the improvement of a transfer rate and the improvement of the workability of editing work and the like.

When the recording or the reproducing of the information signal is completed, the drive motor is rotated in the opposite direction to that at the preceding time, and then the disk cartridge 1 is ejected in conformity with the actions reverse to those described above. That is, first, the cam sliders 57 are moved into the L2 direction, and the disk holder 59 holding the disk cartridge 1 is moved into an H2 direction (upper direction) in one body with the rack member 62. Next, the rack member 62 is moved into the L1 direction, and the inner shell 3 is rotated into an R2 direction. Thereby, the opening portion 22 is closed with the shutter members 4, and then the cam sliders 57 are again moved into the L2 direction. Thus, the disk holder 59 holding the disk cartridge 1 is moved into the L2 direction. At this time, the surface of the disk cartridge 1 on the side of the leading end edge 2a is pressed by a not shown pair of ejection levers provided on the disk drive apparatus 50, and then a part of the disk cartridge 1 on the side of the base end edge 2b protrudes from the insertion opening 51a. The user can take out the disk cartridge 1 from the disk drive apparatus 50 by holding the protruded part to pull out the disk cartridge 1 from the insertion opening 51a.

As described above, the discrimination groove 17 opened to the side of the insertion direction to the insertion opening 51a of the disk drive apparatus 50 for performing the discrimination of the disk cartridge 1 from the other types of disk cartridges is formed. Consequently, the type of an inserted disk cartridge is discriminated at the point of time of the insertion thereof into the insertion opening 51a. In case of erroneous insertion, the disk cartridge may be taken out immediately after the insertion thereof into the insertion opening 51a. Thereby, improvement of usability cam be achieved.

Moreover, it is not required to provide a complicated discrimination mechanism for discriminating a disk cartridge from the other types of disk cartridges in the inside of the disk drive apparatus 50, and consequently the simplification of the mechanism of the disk drive apparatus 50 and the reduction of a manufacturing cost can be achieved.

Moreover, only the disk-shaped recording medium 5 of the disk cartridge 1 having the opening portion 22 corresponding to the two optical pickups 67 is mounted on the disk table 66 of the disk drive apparatus 50. Consequently, there is no need for retracting one of the optical pickups 67 for preventing the contact of a disk cartridge based on with the standards for consumer use with the optical pickup 67, and thereby any retraction spaces are not needed. Hence, the disk drive apparatus 50 can be shaped to be smaller in size by the retraction space, and the actions of the optical pickups 67 can be simultaneously started to achieve the shortening of a time until the start of the operations.

Furthermore, the discrimination pin 61 is inserted into the discrimination groove 17 and is contacted with the interior side positional reference surface 17d to perform the positioning to the disk holder 59 in the insertion direction. Consequently, when the disk holder 59 descends, the positioning pins 72c of the locating portions 72 can be inserted smoothly into the positioning holes 12b and 13c, respectively, and thereby it is possible to prevent the scratching, the abrasion and the like of the positioning pins 72c and the positioning holes 12b and 13c owing to their contact.

In addition, in the disk cartridge 1, the discrimination groove 17 is not penetrated in the up and down direction, and the leading end edge 2a is not broken off from the left end thereof to the right end thereof. Consequently, for example, each portion provided in the inside of the disk drive apparatus 50, such as the ejection levers, is not inserted into the discrimination groove 17. Hence, defects such as ejection errors owing to the ejection levers can be prevented.

Incidentally, generally, in a disk drive apparatus, when the disk cartridge 1 is inserted, each portion such as the ejection levers is not arranged at positions in the neighborhood of the reference areas 16 for avoiding interferences with the locating portions 72 and the receiving portions 73. Consequently, the formation of the discrimination groove 17 in the neighborhood of the reference areas 16 as in the disk cartridge 1 makes it possible to prevent the interference with each portion such as the ejection levers in case of the insertion of the disk cartridge 1 into a disk drive apparatus compatible with the standards for consumer use by mistake.

Moreover, it is also considerable that a plurality of discrimination grooves 17 is formed on a disk cartridge. However, forming only one discrimination groove 17 as in the disk cartridge 1 decreases the possibility of not intended insertion of each portion provided in the inside of the disk drive apparatus 50 into the discrimination groove 17 in comparison with the case of forming the plurality of the discrimination grooves 17. For example, even if one of the ejection levers has been inserted into the discrimination groove 17, the leading end edge 2a is certainly pressed by the other ejection lever, and the ejection of the disk cartridge 1 can be performed certainly.

Figure 23:
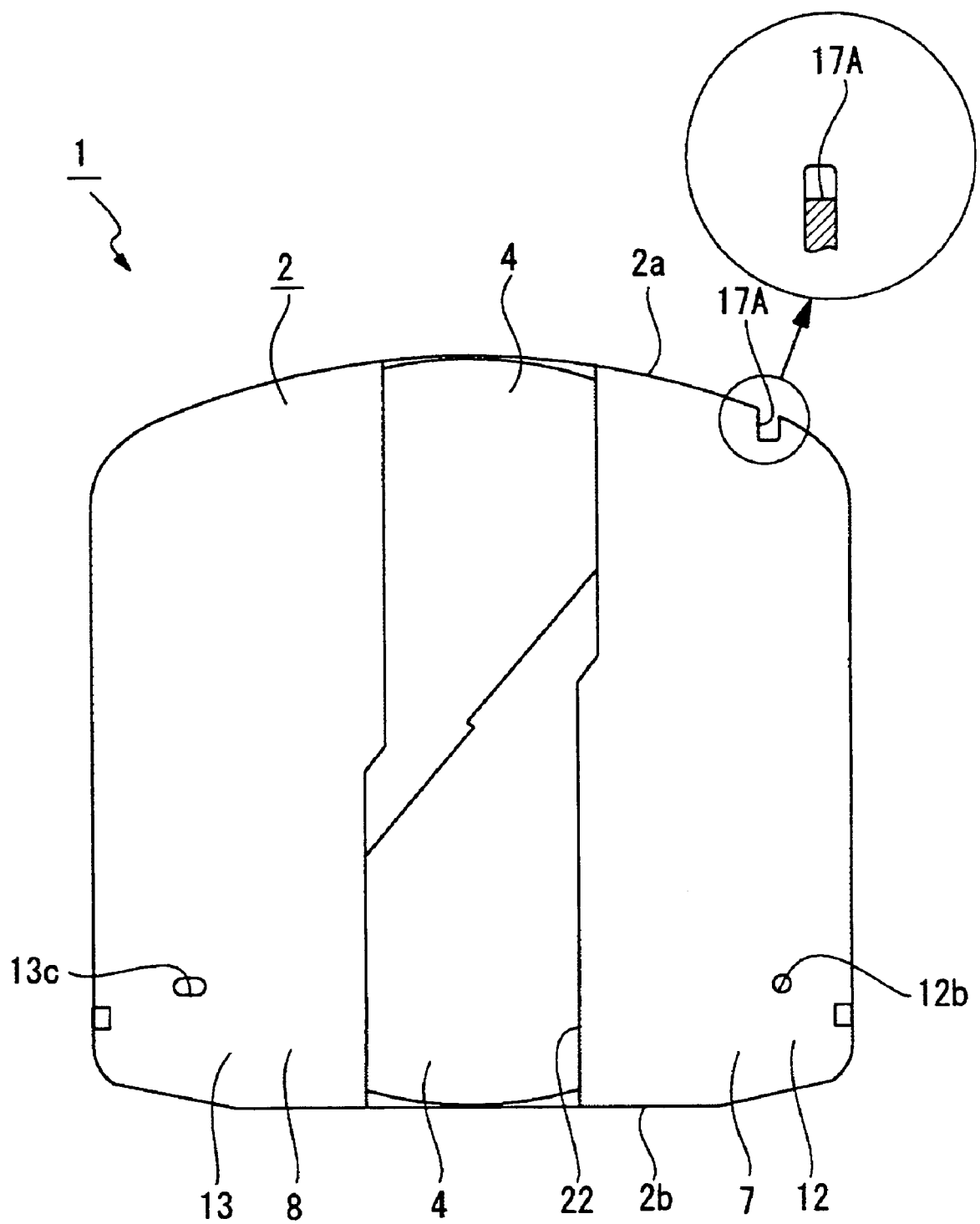
FIG. 23 is a conceptual view showing a disk cartridge including a discrimination groove opened to an insertion direction and an up-and-down direction among other shapes of the discrimination grooves, which are also shown in FIGS. 24 and 25.
Figure 24:
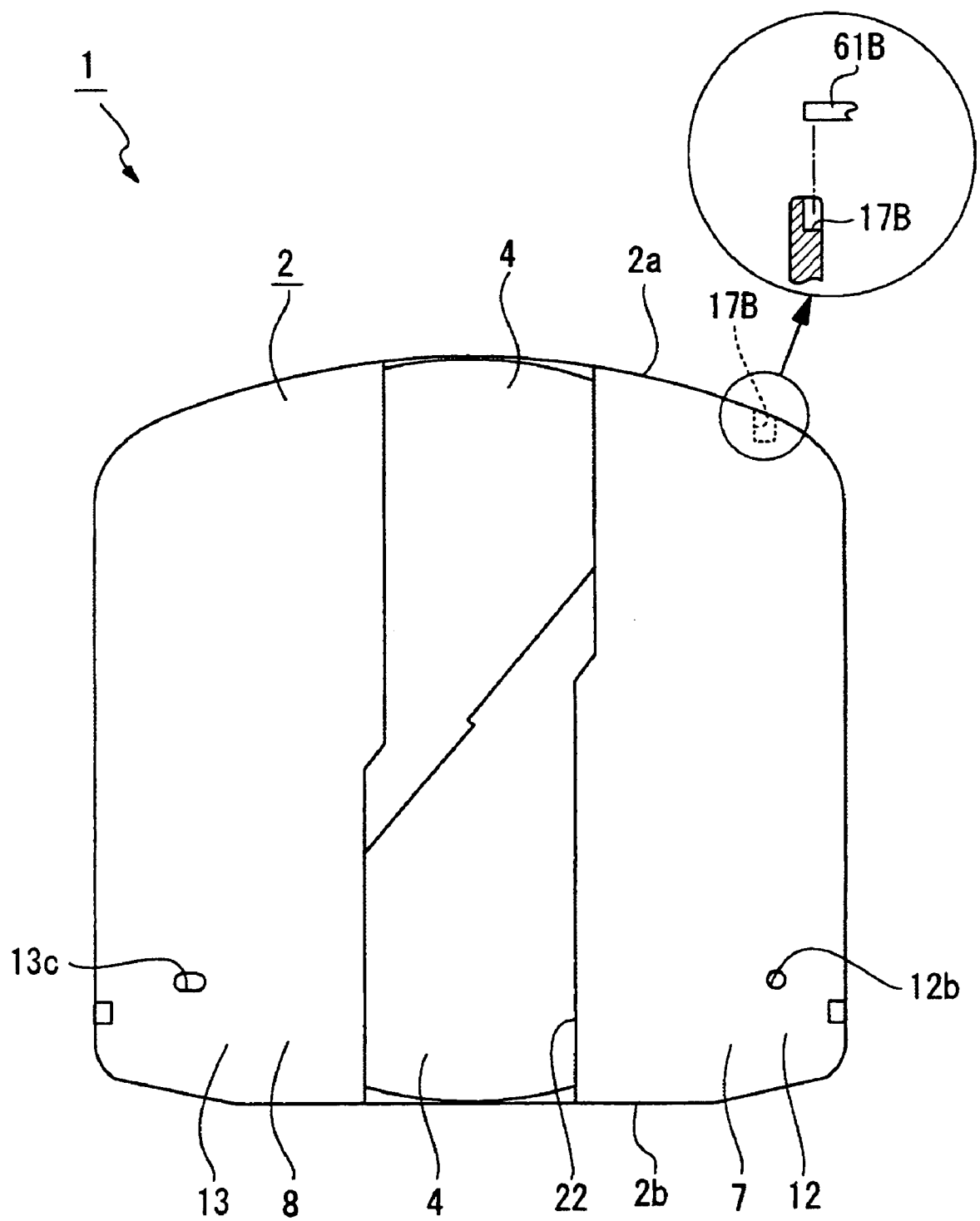
FIG. 24 is a conceptual view of a disk cartridge including a discrimination groove opened to the insertion direction and an upper direction.
Figure 25:
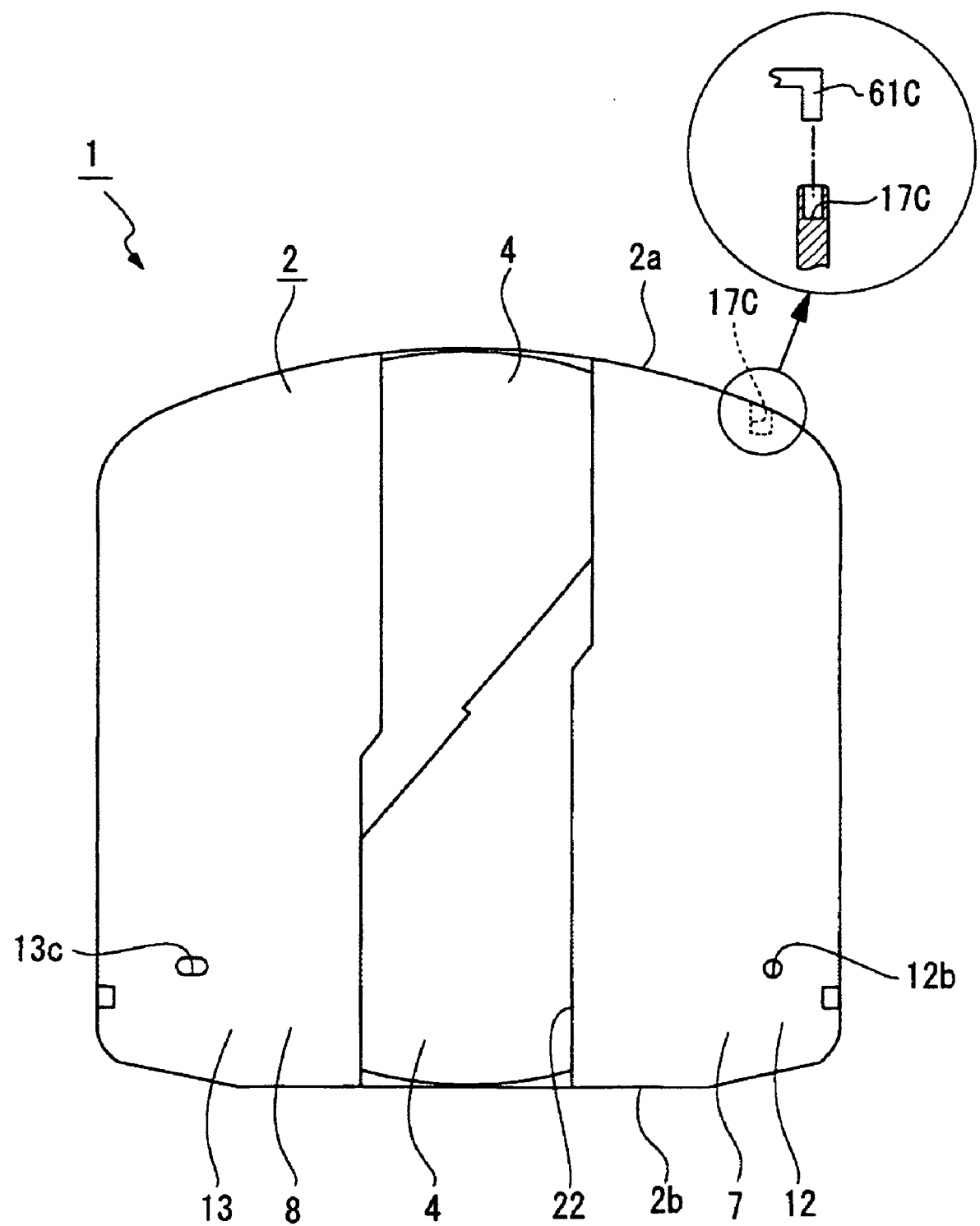
FIG. 25 is a conceptual view of a disk cartridge including a discrimination groove opened only to the insertion direction.

The above description has been given to the disk cartridge 1 including the discrimination groove 17 opened downward and into the insertion direction. However, it is sufficient for the discrimination groove to be opened at least into the insertion direction. For example, a discrimination groove 17A opened into the insertion direction and the up-and-down direction as shown in FIG. 23 may be adopted. A discrimination groove 17B opened into the insertion direction and the upper direction as shown in FIG. 24 may be adopted also. Furthermore, a discrimination groove 17C opened only into the insertion direction as shown in FIG. 25 may be adopted. Also in the discrimination grooves 17A, 17B and 17C, it is preferable to form introducing parts for the smooth insertion of the discrimination pin similarly to the introducing parts 17a in the discrimination groove 17.

In case of the discrimination groove 17B, a discrimination pin 61B protruding downward can be provide in the disk drive apparatus 50. In case of the discrimination groove 17C, a discrimination pin 61C protruding forward can be provide in the disk drive apparatus 50.

Figure 26:
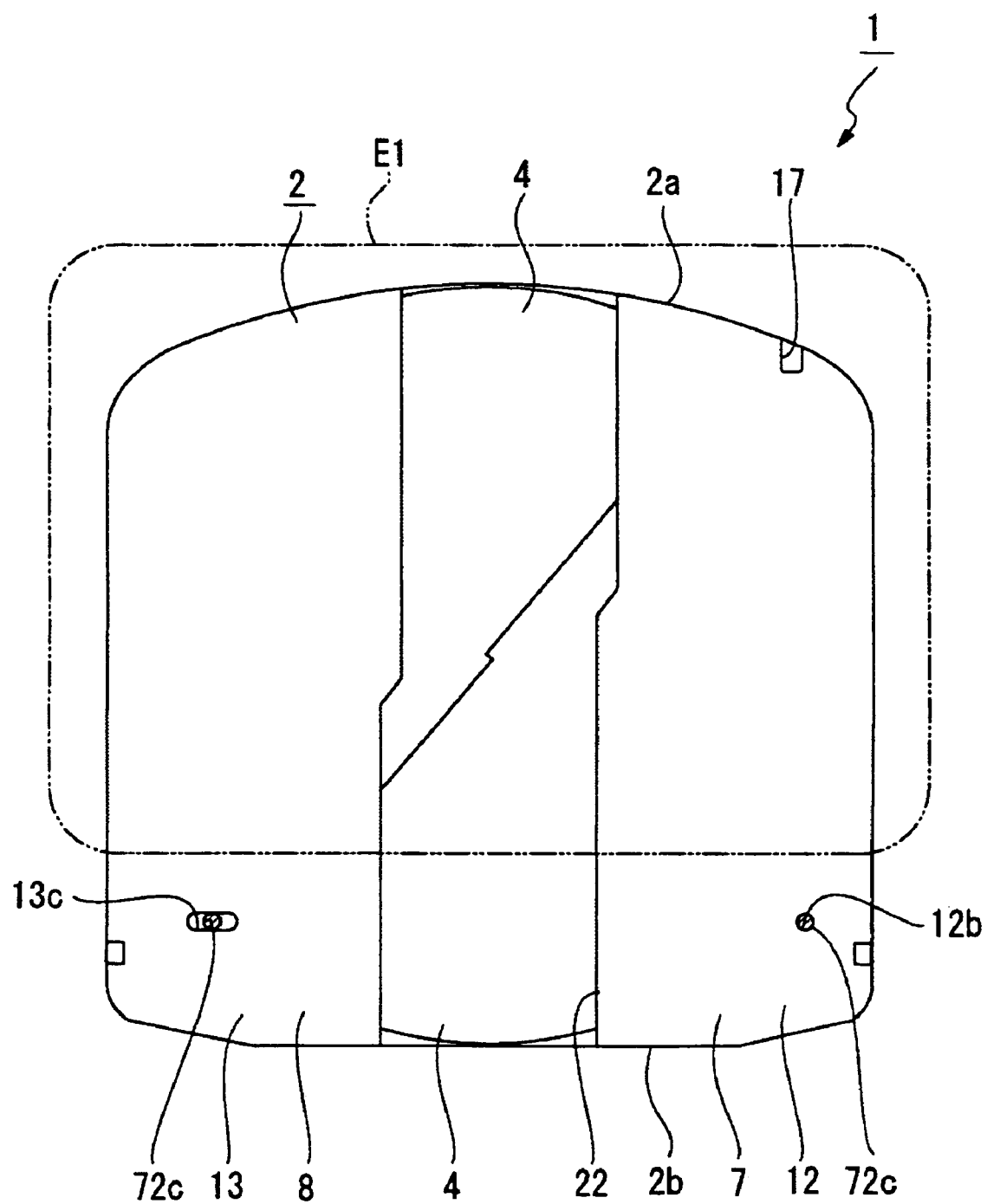
FIG. 26 is a conceptual view for illustrating an arrangeable area of each mechanism when the positioning of the disk cartridge is performed by means of positioning holes separated in an X-direction.

In the embodiment described above, when the disk holder 59 descends from the retracted position toward the mounting position, the positioning of the disk cartridge 1 to the disk drive apparatus 50 is performed by means of the positioning holes 12b and 13c separated in the X-direction. In this case, an area in which each mechanism to be provided in the disk drive apparatus 50 can be arranged is, as shown in FIG. 26, an area E1 except the area on the side of the base end edge 2b of the disk cartridge 1 which is the part where the locating portions 72 are prevented. Consequently, the area E1 does not cover the whole of the opening portion 22.

Figure 27:
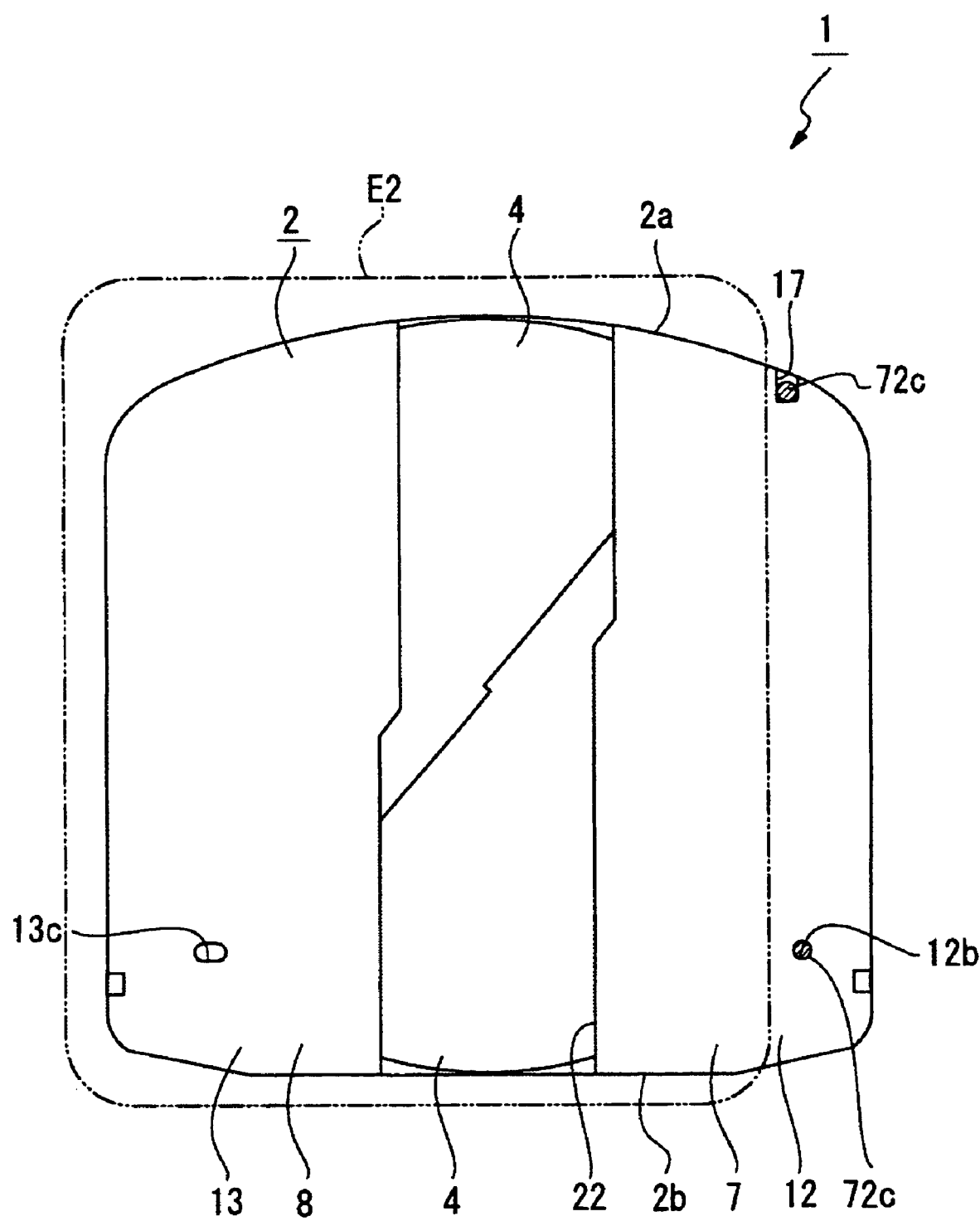
FIG. 27 is a conceptual view for illustrating an arrangeable area of each mechanism when the positioning of the disk cartridge is performed by means of the positioning hole and the discrimination groove which are separated in a Y direction.

On the other hand, in the disk cartridge 1, when the disk holder 59 descends from the retracted position toward the mounting position, it is possible to perform the positioning of the disk cartridge 1 to the disk drive apparatus 50 by means of the positioning hole 12b and the discrimination groove 17 separated in the Y direction. At this time, it is necessary to form the locating portions 72 at the positions in the disk drive apparatus 50 correspondingly to the positioning hole 12b and the discrimination groove 17. In this case, an area in which each mechanism to be provided in the disk drive apparatus 50 can be arranged is, as shown in FIG. 27, an area E2 except an area on the side of the left side edge of the disk cartridge 1 which is a part where the locating portions 72 are prevented. Consequently, the area E2 covers the whole of the opening portion 22.

As described above, by the use of the positioning hole 12b and the discrimination groove 17 at the time of positioning, the area E2, in which the whole of the opening portion 22 can be covered, can be set as an area in which each mechanism to be provided in the disk drive apparatus 50 can be arranged. Consequently, in the disk drive apparatus 50 including the two optical pickups 67 correspondingly to the standards for professional use, the use of the positioning hole 12b and the discrimination groove 17 is advantageous for the arrangement of each mechanism.

All of the concrete shapes and the structures of respective portions shown in the embodiment described above are only examples for implementing the present invention, and consequently the scope and the spirit of the present invention should not be interpreted to be limited to those examples.

What is claimed is:

1. In a disk cartridge comprising:
an outer shell having a first shell, second shell, and an opening portion through which a disk table of a disk drive apparatus is inserted;
an inner shell supported to slidably rotate in an inside of the outer shell;
shutter members supported to slidably rotate at the inner shell; and
a disk-shaped recording medium rotatably housed in a housing space formed between the inner shell and the first shell of the outer shell, wherein slidable rotation of the inner shell to the outer shell causes slidable rotation of the shutter members to open or close the opening portion of the outer shell, and the disk cartridge is inserted into an insertion opening of the disk drive apparatus so that the disk-shaped recording medium is mounted on the disk table to be used; wherein said disk cartridge further comprising;
an discrimination groove formed on the outer shell and opened to an insertion direction side to the insertion opening of the disk drive apparatus for performing discrimination from another type of the disk cartridge.

2. The disk cartridge as cited in claim 1, wherein:
an interior surface in an opposite direction to the insertion direction of the discrimination groove on the outer shell is formed as a positional reference surface for performing positioning in the insertion direction.

3. The disk cartridge as cited in claim 1, wherein:
each of the first shell and the second shell includes a principal surface portion positioned to be opposed to the disk-shaped recording medium, and a peripheral surface portion formed on a peripheral edge of the principal surface portion; and
the discrimination groove is formed without penetrating between the principal surface portion of the first shell and the principal surface portion of the second shell.

4. The disk cartridge as cited in claim 1, wherein:
a reference area to be a reference of the positioning of the disk cartridge to the disk drive apparatus when the disk cartridge is inserted into the inside of the disk drive apparatus is formed on the outer shell; and
the discrimination groove is formed in the neighborhood of the reference area.

5. The disk cartridge as cited in claim 1, wherein:
only one discrimination groove is formed as the discrimination groove.

* * * * *